United States Patent
Bernstein et al.

(10) Patent No.: US 10,248,118 B2
(45) Date of Patent: *Apr. 2, 2019

(54) REMOTELY CONTROLLING A SELF-PROPELLED DEVICE IN A VIRTUALIZED ENVIRONMENT

(71) Applicant: Sphero, Inc., Boulder, CO (US)

(72) Inventors: Ian Bernstein, Boulder, CO (US);
Adam Wilson, Longmont, CO (US);
Jonathan Carroll, Boulder, CO (US);
Fabrizio Polo, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,827

(22) Filed: Nov. 5, 2015

(65) Prior Publication Data

US 2016/0054734 A1 Feb. 25, 2016

Related U.S. Application Data

(63) Continuation of application No. 13/766,455, filed on Feb. 13, 2013, now Pat. No. 9,218,316, which is a
(Continued)

(51) Int. Cl.
*G05D 1/00* (2006.01)
*G06F 17/00* (2019.01)
(Continued)

(52) U.S. Cl.
CPC .......... *G05D 1/0038* (2013.01); *A63H 30/04* (2013.01); *A63H 33/005* (2013.01);
(Continued)

(58) Field of Classification Search
CPC .. G05D 1/0038; G05D 1/0016; G05D 1/0044; G05D 2201/0214; G05D 1/027; G05D 1/0259; G05D 1/0278; A63H 30/04; A63H 33/005; G06F 17/00; B62D 63/025; Y10S 901/01
See application file for complete search history.

(56) References Cited

U.S. PATENT DOCUMENTS

| 90,546 A | 5/1869 | Huntington |
|---|---|---|
| 933,623 A | 9/1909 | Cecil |

(Continued)

FOREIGN PATENT DOCUMENTS

| CN | 1302717 | 7/2001 |
|---|---|---|
| CN | 1765595 | 5/2006 |

(Continued)

OTHER PUBLICATIONS

US 9,342,073 B2, 05/2016, Berstein et al. (withdrawn)
(Continued)

*Primary Examiner* — Mary Cheung

(57) ABSTRACT

A computing device operating as a controller can obtain image data from a camera component. The computing device can determine a location of the self-propelled device relative to the camera based on the image data. A virtual content may be generated on the computing device based at least in part on the location of the self-propelled device.

12 Claims, 5 Drawing Sheets

Related U.S. Application Data continuation-in-part of application No. 13/342,853, filed on Jan. 3, 2012, now Pat. No. 8,571,781.

(60) Provisional application No. 61/430,023, filed on Jan. 5, 2011, provisional application No. 61/430,083, filed on Jan. 5, 2011, provisional application No. 61/553,923, filed on Oct. 31, 2011.

(51) Int. Cl.
*B62D 63/02* (2006.01)
*A63H 30/04* (2006.01)
*A63H 33/00* (2006.01)
*G05D 1/02* (2006.01)

(52) U.S. Cl.
CPC ......... *B62D 63/025* (2013.01); *G05D 1/0016* (2013.01); *G05D 1/0044* (2013.01); *G06F 17/00* (2013.01); *G05D 1/027* (2013.01); *G05D 1/0259* (2013.01); *G05D 1/0278* (2013.01); *G05D 2201/0214* (2013.01); *Y10S 901/01* (2013.01)

(56) References Cited

U.S. PATENT DOCUMENTS

| | | |
|---|---|---|
| 1,263,262 A | 4/1918 | McFaul |
| 2,769,601 A | 11/1956 | Hagopian |
| 2,949,696 A | 8/1960 | Easterling |
| 2,977,714 A | 4/1961 | Gibson |
| 3,313,365 A | 4/1967 | Jackson |
| 3,667,156 A | 6/1972 | Tomiyama |
| 3,683,216 A | 8/1972 | Post |
| 3,821,995 A | 7/1974 | Aghnides |
| 4,310,987 A | 1/1982 | Chieffo |
| 4,519,466 A | 5/1985 | Shiraishi |
| 4,541,814 A | 9/1985 | Martin |
| 4,601,675 A | 7/1986 | Robinson |
| 4,893,182 A | 1/1990 | Gautraud |
| 4,897,070 A | 1/1990 | Wagstaff |
| 4,996,468 A | 2/1991 | Field et al. |
| 5,087,000 A | 2/1992 | Suto |
| 5,213,176 A | 5/1993 | Oroku et al. |
| 5,297,951 A | 3/1994 | Asai |
| 5,297,981 A | 3/1994 | Maxim et al. |
| 5,342,051 A | 8/1994 | Rankin et al. |
| 5,413,345 A | 5/1995 | Nauck |
| 5,439,408 A | 8/1995 | Wilkinson |
| 5,489,099 A | 2/1996 | Rankin et al. |
| 5,513,854 A | 3/1996 | Daver |
| 5,595,121 A | 1/1997 | Elliot |
| 5,628,232 A | 5/1997 | Bakholdin et al. |
| 5,644,139 A | 7/1997 | Allen et al. |
| 5,676,582 A | 10/1997 | Lin |
| 5,739,657 A | 4/1998 | Takayama et al. |
| 5,759,083 A | 6/1998 | Polumbaum et al. |
| 5,780,826 A | 7/1998 | Hareyama et al. |
| 5,793,142 A | 9/1998 | Richard |
| 5,871,386 A | 2/1999 | Bart et al. |
| 5,952,796 A | 9/1999 | Colgate et al. |
| 5,953,056 A | 9/1999 | Tucker |
| 6,017,272 A | 1/2000 | Rieder |
| 6,021,222 A | 2/2000 | Yamagata |
| 6,144,128 A | 11/2000 | Rosen |
| 6,227,933 B1 | 5/2001 | Michaud et al. |
| 6,246,927 B1 | 6/2001 | Dratman |
| 6,267,673 B1 | 7/2001 | Miyamoto et al. |
| 6,315,667 B1 | 11/2001 | Steinhart |
| 6,320,352 B2 | 11/2001 | Terazoe |
| 6,390,213 B1 | 5/2002 | Bleicher |
| 6,439,956 B1 | 7/2002 | Ho |
| 6,430,471 B1 * | 8/2002 | Kintou .................. H04L 29/06 180/169 |
| 6,449,010 B1 | 9/2002 | Tucker |
| 6,456,938 B1 | 9/2002 | Bernard |
| 6,458,008 B1 | 10/2002 | Hyneman |
| 6,459,955 B1 | 10/2002 | Bartsch et al. |
| 6,502,657 B2 | 1/2003 | Kerrebrock et al. |
| 6,535,793 B2 | 3/2003 | Allard |
| 6,573,883 B1 | 6/2003 | Bartlett |
| 6,584,376 B1 | 6/2003 | Van Kommer |
| 6,604,181 B1 | 8/2003 | Moriya |
| 6,615,109 B1 | 9/2003 | Matsuoka et al. |
| 6,764,373 B1 | 7/2004 | Osawa et al. |
| 6,785,590 B2 | 8/2004 | Kasuga et al. |
| 6,786,795 B1 | 9/2004 | Mullaney et al. |
| 6,789,768 B1 | 9/2004 | Kalisch |
| 6,856,696 B1 | 2/2005 | Ajioka |
| 6,859,555 B1 | 2/2005 | Fang |
| 6,901,110 B1 | 5/2005 | Tsougarakis et al. |
| 6,902,464 B1 | 6/2005 | Lee |
| 6,945,843 B1 | 9/2005 | Motosko |
| 6,980,956 B1 | 12/2005 | Takagi et al. |
| 7,058,205 B2 | 6/2006 | Jepson et al. |
| 7,069,113 B2 | 6/2006 | Matsuoka et al. |
| 7,130,741 B2 | 10/2006 | Bodin et al. |
| 7,170,047 B2 | 1/2007 | Pal |
| 7,173,604 B2 | 2/2007 | Marvit et al. |
| 7,258,591 B2 | 8/2007 | Xu et al. |
| 7,283,647 B2 | 10/2007 | McNitt |
| 7,292,711 B2 | 11/2007 | Kiraly et al. |
| 7,298,869 B1 | 11/2007 | Abernathy |
| 7,324,663 B2 | 1/2008 | Kiraly et al. |
| 7,328,671 B2 | 2/2008 | Kates |
| 7,340,077 B2 | 3/2008 | Gokturk et al. |
| 7,340,344 B2 | 3/2008 | Chappell |
| 7,344,430 B2 | 3/2008 | Hasty et al. |
| 7,409,924 B2 | 8/2008 | Kates |
| 7,424,867 B2 | 9/2008 | Kates |
| 7,432,718 B2 | 10/2008 | Ishihara et al. |
| 7,463,001 B2 | 12/2008 | Tsurukawa |
| 7,499,077 B2 | 3/2009 | Li |
| 7,501,780 B2 | 3/2009 | Yamamoto |
| 7,526,362 B2 | 4/2009 | Kim et al. |
| 7,538,764 B2 | 5/2009 | Salomie |
| 7,639,874 B2 | 12/2009 | Bushell et al. |
| 7,699,683 B2 | 4/2010 | Caspi |
| 7,702,131 B2 | 4/2010 | Chinen et al. |
| 7,714,880 B2 | 5/2010 | Johnson |
| 7,714,895 B2 | 5/2010 | Pretlove et al. |
| 7,726,422 B2 | 6/2010 | Sun et al. |
| 7,729,537 B2 | 6/2010 | Grady |
| 7,755,660 B2 | 7/2010 | Nejikovsky et al. |
| 7,773,773 B2 | 8/2010 | Abercrombie |
| 7,822,507 B2 | 10/2010 | Ishihara et al. |
| 7,847,504 B2 | 12/2010 | Hollis |
| 7,853,357 B2 | 12/2010 | Sawada et al. |
| 7,889,226 B2 | 2/2011 | Pescatore et al. |
| 7,957,837 B2 | 6/2011 | Ziegler et al. |
| 7,979,162 B2 | 7/2011 | Niemela et al. |
| 8,025,551 B2 | 9/2011 | Torres et al. |
| 8,038,504 B1 | 10/2011 | Wong |
| 8,077,914 B1 | 12/2011 | Kaplan |
| 8,099,189 B2 | 1/2012 | Kaznov et al. |
| 8,128,450 B2 | 3/2012 | Imai |
| 8,128,500 B1 | 3/2012 | Borst et al. |
| 8,142,287 B2 | 3/2012 | Podoloff |
| 8,144,118 B2 | 3/2012 | Hildreith |
| 8,180,436 B2 | 5/2012 | Boyden et al. |
| 8,190,295 B1 | 5/2012 | Garretson |
| 8,195,333 B2 | 6/2012 | Ziegler et al. |
| 8,197,298 B2 | 6/2012 | Willett |
| 8,210,289 B1 | 7/2012 | Lu et al. |
| 8,258,917 B2 | 9/2012 | Cai et al. |
| 8,269,447 B2 | 9/2012 | Smoot et al. |
| 8,274,406 B2 | 9/2012 | Karlsson et al. |
| 8,275,544 B1 | 9/2012 | Wells et al. |
| 8,326,469 B2 | 12/2012 | Phillips et al. |
| 8,330,639 B2 | 12/2012 | Wong et al. |
| 8,352,643 B2 | 1/2013 | Birnbaum et al. |
| 8,355,818 B2 | 1/2013 | Nielsen et al. |
| 8,364,136 B2 | 1/2013 | Hoffberg et al. |
| 8,376,756 B2 | 2/2013 | Robb |

(56) References Cited

U.S. PATENT DOCUMENTS

| | | |
|---|---|---|
| 8,392,065 B2 | 3/2013 | Tolstedt et al. |
| 8,396,611 B2 | 3/2013 | Phillips et al. |
| 8,400,619 B1 | 3/2013 | Bernstein et al. |
| 8,417,384 B2 | 4/2013 | Togawa et al. |
| 8,430,192 B2 | 4/2013 | Gillett |
| 8,442,661 B1 | 5/2013 | Blackwell et al. |
| 8,459,383 B1 | 6/2013 | Burget |
| 8,522,902 B2 | 9/2013 | Gomi et al. |
| 8,523,846 B2 | 9/2013 | Makino |
| 8,540,038 B1 | 9/2013 | Ullman |
| 8,571,781 B2 | 10/2013 | Bernstein et al. |
| 8,577,595 B2 | 11/2013 | Zhao et al. |
| 8,600,600 B2 | 12/2013 | Jung |
| 8,670,889 B2 | 3/2014 | Kaznov |
| 8,672,062 B2 | 3/2014 | Schroll et al. |
| 8,751,063 B2 | 6/2014 | Bernstein et al. |
| 8,766,983 B2 | 7/2014 | Marks et al. |
| 8,788,130 B1 | 7/2014 | Tran et al. |
| 8,805,947 B1 | 8/2014 | Kuzkin |
| 8,811,675 B2 | 8/2014 | Chadranshekar |
| 8,838,273 B2 | 9/2014 | Hvass et al. |
| 8,854,392 B2 | 10/2014 | Child |
| 8,862,301 B2 | 10/2014 | Araki et al. |
| 8,882,559 B2 | 11/2014 | Fessenmaier |
| 8,885,882 B1 | 11/2014 | Yin et al. |
| 9,008,860 B2 | 4/2015 | Waldock |
| 9,011,197 B2 | 4/2015 | Smoot et al. |
| 9,014,848 B2 | 4/2015 | Farlow et al. |
| 9,041,622 B2 | 5/2015 | McCulloch |
| 9,090,214 B2 | 7/2015 | Bernstein et al. |
| 9,114,838 B2 | 8/2015 | Bernstein et al. |
| 9,150,263 B2 | 10/2015 | Bernstein et al. |
| 9,171,211 B2 | 10/2015 | Keat |
| 9,193,404 B2 | 11/2015 | Bernstein et al. |
| 9,211,920 B1 | 12/2015 | Bernstein et al. |
| 9,218,316 B2 | 12/2015 | Bernstein et al. |
| 9,280,717 B2 | 3/2016 | Polo et al. |
| 9,290,220 B2 | 3/2016 | Bernstein et al. |
| 9,292,758 B2 | 3/2016 | Polo et al. |
| 9,389,612 B2 | 7/2016 | Bernstein et al. |
| 9,394,016 B2 | 7/2016 | Bernstein et al. |
| 9,395,725 B2 | 7/2016 | Berstein et al. |
| 9,429,940 B2 | 8/2016 | Bernstein et al. |
| 9,457,730 B2 | 10/2016 | Berstein et al. |
| 9,481,410 B2 | 11/2016 | Bernstein et al. |
| 9,483,876 B2 | 11/2016 | Polo et al. |
| 9,558,612 B2 | 1/2017 | Lyons |
| 2002/0011368 A1 | 1/2002 | Berg |
| 2002/0036104 A1 | 3/2002 | Kerrebrock et al. |
| 2002/0142701 A1 | 10/2002 | Rosenberg |
| 2003/0093182 A1 | 5/2003 | Yokoyama |
| 2003/0118217 A1 | 6/2003 | Kondo et al. |
| 2003/0179176 A1 | 9/2003 | Waterston |
| 2003/0216834 A1 | 11/2003 | Allard |
| 2003/0216835 A1 | 11/2003 | Wakui |
| 2004/0002843 A1 | 1/2004 | Robarts et al. |
| 2004/0013295 A1* | 1/2004 | Sabe ............... G06K 9/00664 382/153 |
| 2004/0015266 A1 | 1/2004 | Skoog |
| 2004/0158357 A1* | 8/2004 | Lee ............... B60L 11/1833 700/258 |
| 2004/0168837 A1 | 9/2004 | Michaud et al. |
| 2004/0182614 A1 | 9/2004 | Yoshiaki |
| 2004/0186623 A1 | 9/2004 | Dooley et al. |
| 2004/0192163 A1 | 9/2004 | Siegel |
| 2004/0198159 A1 | 10/2004 | Xu et al. |
| 2005/0004723 A1 | 1/2005 | Duggan et al. |
| 2005/0041839 A1* | 2/2005 | Saitou ............... H04N 1/00127 382/103 |
| 2005/0091684 A1 | 4/2005 | Kawabata |
| 2005/0186884 A1 | 8/2005 | Evans |
| 2005/0216186 A1 | 9/2005 | Dorfman |
| 2005/0226192 A1 | 10/2005 | Red |
| 2005/0264472 A1 | 12/2005 | Rast |
| 2006/0080802 A1 | 4/2006 | Tani |
| 2006/0095158 A1 | 5/2006 | Lee et al. |
| 2006/0101465 A1 | 5/2006 | Kato et al. |
| 2006/0132318 A1 | 6/2006 | Shimizu |
| 2006/0164261 A1 | 7/2006 | Stiffler |
| 2006/0241812 A1 | 10/2006 | Jung |
| 2006/0271251 A1 | 11/2006 | Hopkins |
| 2007/0034734 A1 | 2/2007 | Yoeli |
| 2007/0078004 A1 | 4/2007 | Suzuki |
| 2007/0085706 A1 | 4/2007 | Feyereisen et al. |
| 2007/0112462 A1 | 5/2007 | Kim et al. |
| 2007/0150103 A1 | 6/2007 | Im |
| 2007/0162862 A1 | 7/2007 | Ogasawara |
| 2007/0192910 A1 | 8/2007 | Vu |
| 2007/0215394 A1 | 9/2007 | Sun |
| 2007/0249422 A1 | 10/2007 | Podoloff |
| 2007/0259592 A1 | 11/2007 | Imai et al. |
| 2007/0282484 A1 | 12/2007 | Chung et al. |
| 2008/0009965 A1 | 1/2008 | Bruemmer et al. |
| 2008/0012518 A1 | 1/2008 | Yamamoto |
| 2008/0033641 A1 | 2/2008 | Medalia |
| 2008/0077284 A1 | 3/2008 | Swope |
| 2008/0082208 A1 | 4/2008 | Hong |
| 2008/0086236 A1* | 4/2008 | Saito ............... G01S 5/0252 700/245 |
| 2008/0086241 A1 | 4/2008 | Phillips et al. |
| 2008/0121097 A1 | 5/2008 | Rudakevych et al. |
| 2008/0174268 A1 | 7/2008 | Koo et al. |
| 2008/0174448 A1 | 7/2008 | Hudson |
| 2008/0182479 A1 | 7/2008 | Elliott et al. |
| 2008/0240507 A1 | 10/2008 | Niwa et al. |
| 2008/0263628 A1 | 10/2008 | Norman et al. |
| 2008/0267450 A1 | 10/2008 | Sugimoto et al. |
| 2008/0269949 A1 | 10/2008 | Norman et al. |
| 2009/0016583 A1 | 1/2009 | Wolf |
| 2009/0018712 A1 | 1/2009 | Duncan |
| 2009/0028439 A1 | 1/2009 | Elangovan et al. |
| 2009/0033623 A1 | 2/2009 | Lin |
| 2009/0055019 A1 | 2/2009 | Stiehl et al. |
| 2009/0057238 A1 | 3/2009 | Garti |
| 2009/0069084 A1 | 3/2009 | Reece |
| 2009/0073034 A1 | 3/2009 | Lin |
| 2009/0078484 A1 | 3/2009 | Kocijan |
| 2009/0081923 A1 | 3/2009 | Dooley et al. |
| 2009/0118020 A1 | 5/2009 | Koivisto |
| 2009/0133467 A1 | 5/2009 | Mori et al. |
| 2009/0138232 A1 | 5/2009 | Fuwa |
| 2009/0153349 A1 | 6/2009 | Lin |
| 2009/0157221 A1 | 6/2009 | Sip |
| 2009/0161983 A1 | 6/2009 | Ciurea |
| 2009/0164638 A1 | 6/2009 | Jang |
| 2009/0171516 A1 | 7/2009 | Reich |
| 2009/0187299 A1 | 7/2009 | Fregene |
| 2009/0198371 A1 | 8/2009 | Emanuel et al. |
| 2009/0204261 A1 | 8/2009 | Strand et al. |
| 2009/0222148 A1 | 9/2009 | Knotts et al. |
| 2009/0226035 A1 | 9/2009 | Iihoshi et al. |
| 2009/0245656 A1 | 10/2009 | Hu |
| 2009/0256822 A1 | 10/2009 | Amireh et al. |
| 2009/0257741 A1 | 10/2009 | Greb |
| 2009/0262074 A1 | 10/2009 | Nasiri et al. |
| 2009/0265671 A1 | 10/2009 | Sachs et al. |
| 2009/0278932 A1 | 11/2009 | Yi |
| 2009/0284553 A1 | 11/2009 | Seydoux |
| 2009/0316012 A1 | 12/2009 | Matos |
| 2010/0002909 A1 | 1/2010 | Lefevre et al. |
| 2010/0004798 A1 | 1/2010 | Bodin et al. |
| 2010/0010669 A1 | 1/2010 | Lee et al. |
| 2010/0010672 A1 | 1/2010 | Wang et al. |
| 2010/0032224 A1 | 2/2010 | Liu |
| 2010/0057059 A1 | 3/2010 | Makino |
| 2010/0063652 A1 | 3/2010 | Anderson |
| 2010/0066676 A1 | 3/2010 | Kramer et al. |
| 2010/0084513 A1 | 4/2010 | Gariepy et al. |
| 2010/0090661 A1 | 4/2010 | Chen et al. |
| 2010/0106344 A1 | 4/2010 | Edwards et al. |
| 2010/0145236 A1 | 6/2010 | Greenberg et al. |
| 2010/0169098 A1 | 7/2010 | Patch |
| 2010/0172287 A1 | 7/2010 | Krieter |
| 2010/0178982 A1 | 7/2010 | Ehrman |

(56) References Cited

U.S. PATENT DOCUMENTS

| | | |
|---|---|---|
| 2010/0183195 A1 | 7/2010 | Sharma |
| 2010/0234993 A1 | 9/2010 | Seelinger et al. |
| 2010/0241289 A1 | 9/2010 | Sandberg |
| 2010/0261526 A1 | 10/2010 | Anderson et al. |
| 2010/0264756 A1 | 10/2010 | Lee et al. |
| 2010/0283988 A1 | 11/2010 | Mosier et al. |
| 2010/0302247 A1 | 12/2010 | Perez et al. |
| 2010/0302359 A1 | 12/2010 | Adams |
| 2010/0305778 A1 | 12/2010 | Dorneich et al. |
| 2010/0305781 A1 | 12/2010 | Felix |
| 2010/0312917 A1 | 12/2010 | Allport |
| 2010/0324753 A1 | 12/2010 | Okumatsu |
| 2011/0003640 A9 | 1/2011 | Ehrman |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2011/0035054 A1 | 2/2011 | Gal et al. |
| 2011/0050940 A1 | 3/2011 | Lanz et al. |
| 2011/0060492 A1 | 3/2011 | Kaznov |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0082566 A1 | 4/2011 | Herr et al. |
| 2011/0087371 A1 | 4/2011 | Sandberg et al. |
| 2011/0138416 A1 | 6/2011 | Kang et al. |
| 2011/0153885 A1 | 6/2011 | Mak et al. |
| 2011/0156943 A1 | 6/2011 | Wong et al. |
| 2011/0174565 A1 | 7/2011 | Rochat |
| 2011/0183732 A1 | 7/2011 | Block et al. |
| 2011/0184590 A1 | 7/2011 | Duggan et al. |
| 2011/0201362 A1 | 8/2011 | Bregman-Amitai et al. |
| 2011/0132671 A1 | 9/2011 | Lee et al. |
| 2011/0213278 A1 | 9/2011 | Horak et al. |
| 2011/0231013 A1 | 9/2011 | Smoot et al. |
| 2011/0234488 A1 | 9/2011 | Ge et al. |
| 2011/0237324 A1 | 9/2011 | Clavin et al. |
| 2011/0246904 A1 | 10/2011 | Pinto |
| 2011/0249869 A1 | 10/2011 | Stoeffler |
| 2011/0250967 A1 | 10/2011 | Kulas |
| 2011/0249074 A1 | 11/2011 | Cranfill |
| 2011/0273379 A1 | 11/2011 | Chen et al. |
| 2011/0283223 A1 | 11/2011 | Vaittinen et al. |
| 2011/0285349 A1 | 11/2011 | Widmer et al. |
| 2011/0286631 A1 | 11/2011 | Wagner et al. |
| 2011/0291926 A1 | 12/2011 | Gokturk et al. |
| 2011/0294397 A1 | 12/2011 | Tsai |
| 2011/0301901 A1 | 12/2011 | Panagas |
| 2011/0304633 A1 | 12/2011 | Beardsley |
| 2011/0308873 A1 | 12/2011 | Kim et al. |
| 2011/0313568 A1 | 12/2011 | Blackwell et al. |
| 2011/0320153 A1 | 12/2011 | Lightcap |
| 2011/0320830 A1 | 12/2011 | Ito |
| 2012/0009845 A1 | 1/2012 | Schmelzer |
| 2012/0035799 A1 | 2/2012 | Ehrmann |
| 2012/0043149 A1 | 2/2012 | Kim et al. |
| 2012/0043172 A1 | 2/2012 | Ichikawa |
| 2012/0059520 A1 | 3/2012 | Kossett |
| 2012/0065747 A1 | 3/2012 | Brown et al. |
| 2012/0072023 A1 | 3/2012 | Ota |
| 2012/0083945 A1 | 4/2012 | Oakley et al. |
| 2012/0083962 A1 | 4/2012 | Sato et al. |
| 2012/0099756 A1 | 4/2012 | Sherman et al. |
| 2012/0100915 A1 | 4/2012 | Margalit et al. |
| 2012/0106783 A1 | 5/2012 | Chang et al. |
| 2012/0112553 A1 | 5/2012 | Stoner |
| 2012/0129605 A1 | 5/2012 | Livet |
| 2012/0143482 A1 | 6/2012 | Goossen et al. |
| 2012/0146775 A1 | 6/2012 | Kudo et al. |
| 2012/0149359 A1 | 6/2012 | Huang |
| 2012/0155724 A1 | 6/2012 | Kitamura |
| 2012/0167014 A1 | 6/2012 | Joo et al. |
| 2012/0168240 A1 | 7/2012 | Wilson |
| 2012/0173018 A1 | 7/2012 | Allen et al. |
| 2012/0173049 A1 | 7/2012 | Bernstein et al. |
| 2012/0173050 A1 | 7/2012 | Berstein et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0200380 A1 | 8/2012 | Kocijan |
| 2012/0215355 A1 | 8/2012 | Bewley et al. |
| 2012/0229647 A1 | 9/2012 | Calman et al. |
| 2012/0232977 A1 | 9/2012 | Calman et al. |
| 2012/0233015 A1 | 9/2012 | Calman et al. |
| 2012/0240077 A1 | 9/2012 | Vaittinen et al. |
| 2012/0244969 A1 | 9/2012 | Binder |
| 2012/0258645 A1 | 10/2012 | Cheng |
| 2012/0262002 A1 | 10/2012 | Widmer et al. |
| 2012/0293548 A1 | 11/2012 | Perez et al. |
| 2012/0298049 A1 | 11/2012 | Cook et al. |
| 2012/0298430 A1 | 11/2012 | Schroll et al. |
| 2012/0302129 A1 | 11/2012 | Persaud |
| 2012/0306850 A1 | 12/2012 | Balan et al. |
| 2012/0307001 A1 | 12/2012 | Osako et al. |
| 2012/0309261 A1 | 12/2012 | Boman et al. |
| 2012/0311810 A1 | 12/2012 | Gilbert et al. |
| 2013/0022274 A1 | 1/2013 | Lawrence |
| 2013/0040533 A1 | 2/2013 | Miller |
| 2013/0050069 A1 | 2/2013 | Ota |
| 2013/0065482 A1 | 3/2013 | Trickett |
| 2013/0105239 A1 | 5/2013 | Fung |
| 2013/0109272 A1 | 5/2013 | Rindlishbacher |
| 2013/0113307 A1 | 5/2013 | Kim et al. |
| 2013/0143482 A1 | 6/2013 | Regier |
| 2013/0178257 A1 | 7/2013 | Lengseth |
| 2013/0200207 A1 | 8/2013 | Pongratz |
| 2013/0259386 A1 | 10/2013 | Chadranshekar |
| 2013/0265225 A1 | 10/2013 | Nasiri et al. |
| 2013/0293584 A1 | 11/2013 | Anderson et al. |
| 2013/0307875 A1 | 11/2013 | Anderson et al. |
| 2013/0335301 A1 | 12/2013 | Wong et al. |
| 2014/0008496 A1 | 1/2014 | Ye |
| 2014/0015493 A1 | 1/2014 | Wirz et al. |
| 2014/0051513 A1 | 2/2014 | Polo et al. |
| 2014/0120887 A1 | 5/2014 | Huang |
| 2014/0176487 A1 | 6/2014 | Kikuchi |
| 2014/0207280 A1 | 7/2014 | Duffley |
| 2014/0238762 A1 | 8/2014 | Berberian et al. |
| 2014/0249697 A1 | 9/2014 | Fredriksson |
| 2014/0371954 A1 | 12/2014 | Lee et al. |
| 2015/0091697 A1 | 4/2015 | Takayasu |
| 2015/0175202 A1 | 6/2015 | MacGregor |
| 2015/0209664 A1 | 7/2015 | Haseltine |
| 2015/0268666 A1 | 9/2015 | Wang |
| 2016/0033967 A1 | 2/2016 | Bernstein et al. |
| 2016/0090133 A1 | 3/2016 | Bernstein et al. |
| 2016/0148367 A1 | 5/2016 | Polo et al. |
| 2016/0202696 A1 | 7/2016 | Bernstein et al. |
| 2016/0246299 A1 | 8/2016 | Berberian et al. |
| 2016/0282871 A1 | 9/2016 | Berstein et al. |
| 2016/0291591 A1 | 10/2016 | Bernstein et al. |
| 2016/0291595 A1 | 10/2016 | Halloran |
| 2016/0349748 A1 | 12/2016 | Bernstein et al. |
| 2017/0080352 A1 | 3/2017 | Bernstein et al. |
| 2017/0092009 A1 | 3/2017 | Polo et al. |
| 2018/0224845 A1 | 8/2018 | Bernstein et al. |
| 2018/0296911 A1 | 10/2018 | Polo et al. |
| 2018/0364699 A1 | 12/2018 | Bernstein et al. |

FOREIGN PATENT DOCUMENTS

| | | |
|---|---|---|
| CN | 101154110 | 4/2008 |
| CN | 201147642 | 11/2008 |
| CN | 201220111 | 4/2009 |
| CN | 101426664 | 5/2009 |
| CN | 102060060 | 5/2011 |
| CN | 102421629 | 4/2012 |
| DE | 19809168 | 9/1999 |
| DE | 101 46 862 A1 | 5/2002 |
| DE | 102011108689 | 4/2012 |
| EP | 371149 | 6/1990 |
| EP | 1944573 | 7/2008 |
| EP | 102010042395 | 4/2012 |
| GB | 3727 | 1/1898 |
| GB | 2309650 | 8/1997 |

(56) References Cited

FOREIGN PATENT DOCUMENTS

| | | |
|---|---|---|
| GB | 2319756 | 6/1998 |
| JP | 03182290 A | 8/1991 |
| JP | H07-308462 | 11/1995 |
| JP | 09254838 A | 9/1997 |
| JP | 2000218578 A | 8/2000 |
| JP | 2001153650 | 6/2001 |
| JP | 2002126373 | 5/2002 |
| JP | 2002345706 | 12/2002 |
| JP | 2004042246 | 2/2004 |
| JP | 2004148439 | 5/2004 |
| JP | 2004260917 | 9/2004 |
| JP | 2005165692 | 6/2005 |
| JP | 2007072802 | 3/2007 |
| JP | 2007213353 | 8/2007 |
| JP | 2008-040725 A | 2/2008 |
| JP | 2011530756 | 12/2011 |
| JP | 2012022457 | 2/2012 |
| JP | 4893862 | 3/2012 |
| KR | 10-2008-040725 | 8/2008 |
| KR | 10-2008-0073626 | 8/2008 |
| KR | 10-2008-0073626 A | 8/2008 |
| KR | 10-2009-0000013 A | 1/2009 |
| KR | 20100001408 | 1/2010 |
| KR | 10-2008-0092595 A | 7/2010 |
| KR | 10-0969873 B1 | 7/2010 |
| TW | 20105393 | 4/2010 |
| WO | WO-97/25239 A1 | 7/1997 |
| WO | WO-2006/049559 A1 | 5/2006 |
| WO | 2008008847 | 1/2008 |
| WO | WO-2012/094349 A2 | 7/2012 |
| WO | 2012103525 | 8/2012 |

OTHER PUBLICATIONS

U.S. Appl. No. 13/342,908, Office Action dated Dec. 20, 2013, 26 pages.
U.S. Appl. No. 13/342,908, Office Action dated Jun. 5, 2014, 21 pages.
U.S. Appl. No. 13/342,908, Supplemental Amendment and Response filed Apr. 17, 2015, 10 pages.
U.S. Appl. No. 13/342,914, Advisory Action dated Feb. 13, 2014, 3 pages.
U.S. Appl. No. 13/342,914, Amendment and Response filed Sep. 3, 2013, 24 pages.
U.S. Appl. No. 13/342,914, Amendment and Response filed Feb. 3, 2014, 12 pages.
U.S. Appl. No. 13/342,914, Appeal Brief filed Jul. 3, 2014, 27 pages.
U.S. Appl. No. 13/342,914, Office Action dated Jun. 3, 2013, 30 pages.
U.S. Appl. No. 13/342,914, Office Action dated Nov. 13, 2013, 28 pages.
U.S. Appl. No. 13/342,914, Response to Appeal Brief dated Jul. 29, 2014, 10 pages.
U.S. Appl. No. 13/549,097, Amendment and Response filed Mar. 24, 2015, 14 pages.
U.S. Appl. No. 13/549,097, Amendment and Response filed Jan. 22, 2016, 16 pages.
U.S. Appl. No. 13/549,097, Office Action dated Dec. 26, 2014, 20 pages.
U.S. Appl. No. 13/549,097, Office Action dated Oct. 22, 2015, 20 pages.
U.S. Appl. No. 13/549,097, Office Action dated Oct. 4, 2016, 22 pages.
U.S. Appl. No. 13/766,455, Amendment and Response filed Jul. 15, 2015, 11 pages.
U.S. Appl. No. 13/766,455, Notice of Allowance dated Aug. 20, 2015, 15 pages.
U.S. Appl. No. 13/766,455, Office Action dated Apr. 15, 2015, 9 pages.
U.S. Appl. No. 13/894,247, Amendment and Response filed Aug. 13, 2015, 9 pages.
U.S. Appl. No. 13/894,247, Notice of Allowance dated Oct. 29, 2015, 7 pages.
U.S. Appl. No. 13/894,247, Office Action dated Jun. 12, 2015, 14 pages.
U.S. Appl. No. 14/035,841 Amendment and Response filed Sep. 14, 2015, 12 pages.
U.S. Appl. No. 14/035,841, Notice of Allowance dated Sep. 25, 2015, 5 pages.
U.S. Appl. No. 14/035,841, Notice of Allowance dated Oct. 7, 2016, 2 pages.
U.S. Appl. No. 14/035,841, Notice of Allowance dated Oct. 16, 2016, 2 pages.
U.S. Appl. No. 14/035,841, Office Action dated May 13, 2015, 12 pages.
U.S. Appl. No. 14/054,636, Amendment and Response filed Mar. 17, 2016, 13 pages.
U.S. Appl. No. 14/054,636, Amendment and Response filed Sep. 23, 2016, 14 pages.
U.S. Appl. No. 14/054,636, Notice of Allowance dated Dec. 21, 2016, 8 pages.
U.S. Appl. No. 14/054,636, Office Action dated Jan. 20, 2016, 14 pages.
U.S. Appl. No. 14/054,636, Office Action dated Jun. 24, 2016, 23 pages.
U.S. Appl. No. 14/137,954, Amendment and Response filed Aug. 3, 2015, 14 pages.
U.S. Appl. No. 14/137,954, Amendment and Response filed Feb. 5, 2016, 11 pages.
U.S. Appl. No. 14/137,954, Amendment and Response filed Jun. 6, 2016, 12 pages.
U.S. Appl. No. 14/137,954, Notice of Allowance dated Sep. 26, 2016, 8 pages.
U.S. Appl. No. 14/137,954, Office Action dated May 4, 2015, 26 pages.
U.S. Appl. No. 14/137,954, Office Action dated Nov. 5, 2015, 31 pages.
U.S. Appl. No. 14/137,954, Office Action dated Apr. 12, 2016, 27 pages.
U.S. Appl. No. 14/148,541, Amendment and Response filed Sep. 4, 2015, 14 pages.
U.S. Appl. No. 14/148,541, Notice of Allowance dated Nov. 18, 2015, 11 pages.
U.S. Appl. No. 14/148,541, Office Action dated Jun. 4, 2015, 18 pages.
U.S. Appl. No. 14/261,288, Amendment and Response filed Nov. 5, 2015, 12 pages.
U.S. Appl. No. 14/261,288, Notice of Allowance dated Nov. 23, 2015, 10 pages.
U.S. Appl. No. 14/261,288, Office Action dated Jul. 7, 2015, 13 pages.
U.S. Appl. No. 14/271,203, Advisory Action dated Mar. 2, 2016, 3 pages.
U.S. Appl. No. 14/271,203, Amendment and Response filed Oct. 26, 2015, 10 pages.
U.S. Appl. No. 14/271,203, Amendment and Response filed Feb. 23, 2016, 9 pages.
U.S. Appl. No. 14/271,203, Amendment and Response filed Mar. 11, 2016, 9 pages.
U.S. Appl. No. 14/271,203, Amendment and Response filed Jun. 6, 2016, 9 pages.
U.S. Appl. No. 14/271,203, Office Action dated Jul. 27, 2015, 11 pages.
U.S. Appl. No. 61/362,005, filed Jul. 7, 2010, Schmelzer, Richard.
International Search Report and the Written Opinion dated Dec. 3, 2012, for related PCT/US2012/020115 11 pages.
Koshiyama et al., Machine Translation for JP 2000-218578, Aug. 8, 2000, 11 Pages.
GearBox Ball Prototype Jun. 29, 2010, Pictures from Video [online]. Orbotix, Inc., Jun. 30, 2010, 91 pages. Retrieved from the internet:<URL: http://www.youtube.com/watch?v=qRBM7bAaXpU>.

(56) References Cited

OTHER PUBLICATIONS

International Search Report and the Written Opinion dated Aug. 28, 2013, for related PCT/US2013/041023, 11 pages.
Liu, Dalian et al., "Motion Control of a Spherical Mobile Robot by Feedback Linearization," 7th WC on IC&A, Jun. 27, 2008, Chongqing, China, pp. 965-970. 6 pages.
Shu, Guanghui et al., "Motion Control of Spherical Robot Based on Conservation of Angular Momentum," IEEE Intl Conf on Mechatronics & Automation, Aug. 9, 2012, Changchun, China, pp. 599-604. 6 pages.
Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.
Harmo, Panu et al., "Moving Eye—Interactive Telepresence over Internet with a Ball Shaped Mobile Robot," Automation Tech Lab, Finland, Oct. 2, 2001. 6 pages. http://automation.tkk.fi/files/tervetaas/MovingEye4.pdf.
Halme, Aarne, et al., "Motion Control of a Spherical Mobile Robot", Helsinki, IEEE AMC '1996, pp. 259-264. 6 pages.
European Search Report and European Search Opinion dated Nov. 6, 2014, for related EP 12731945.7, 7 pages.
International Search Report and Written Opinion in related PCT/US2014/059973 dated Dec. 17, 2014 13 pages.
"Roll, Pitch, and Yaw 1/ How Things Fly", How Things Fly website, date unknown, retrieved from https://howthingsfly.si.edu/flight-dynamics/roll-pitch-and-yaw.
Korean Office Action in Application 10-2014-7034020, dated Dec. 23, 2016, 11 pages.
U.S. Appl. No. 14/884,632, Office Action dated Jan. 25, 2017, 7 pages.
U.S. Appl. No. 14/271,203, Amendment and Response filed Feb. 1, 2017, 12 pages.
U.S. Appl. No. 13/342,914, Decision on Appeal dated Feb. 1, 2017, 8 pages.
U.S. Appl. No. 14/271,203, Office Action dated Dec. 21, 2015, 10 pages.
U.S. Appl. No. 14/271,203, Office Action dated Apr. 4, 2016, 10 pages.
U.S. Appl. No. 14/271,203, Office Action dated Aug. 1, 2016, 17 pages.
U.S. Appl. No. 14/459,235, Notice of Allowance dated Mar. 6, 2015, 9 pages.
U.S. Appl. No. 14/459,235, Notice of Allowance dated Jun. 25, 2015, 7 pages.
U.S. Appl. No. 14/663,446, Notice of Allowance dated Sep. 25, 2015, 9 pages.
U.S. Appl. No. 14/691,349, Amendment and Response filed Aug. 28, 2015, 11 pages.
U.S. Appl. No. 14/691,349, Amendment and Response filed Jan. 26, 2016, 6 pages.
U.S. Appl. No. 14/691,349, Notice of Allowance dated Mar. 4, 2016, 5 pages.
U.S. Appl. No. 14/691,349, Notice of Allowance dated Jun. 6, 2016, 5 pages.
U.S. Appl. No. 14/691,349, Office Action dated Jul. 17, 2015, 9 pages.
U.S. Appl. No. 14/832,801, Amendment and Response filed Feb. 5, 2016, 10 pages.
U.S. Appl. No. 14/832,801, Amendment and Response filed Feb. 12, 2016, 8 pages.
U.S. Appl. No. 14/832,801, Notice of Allowance dated Mar. 22, 2016, 10 pages.
U.S. Appl. No. 14/832,801, Notice of Allowance dated May 11, 2016, 5 pages.
U.S. Appl. No. 14/832,801, Office Action dated Nov. 6, 2015, 6 pages.
U.S. Appl. No. 14/839,610, Amendment and Response filed Feb. 18, 2016, 11 pages.
U.S. Appl. No. 14/839,610, Notice of Allowance dated Mar. 23, 2016, 16 pages.
U.S. Appl. No. 14/839,610, Office Action dated Nov. 18, 2015, 7 pages.
U.S. Appl. No. 14/850,910, Amendment and Response filed Feb. 18, 2016, 7 pages.
U.S. Appl. No. 14/850,910, Notice of Allowance dated Mar. 17, 2016, 11 pages.
U.S. Appl. No. 14/850,910, Office Action dated Nov. 25, 2015, 8 pages.
U.S. Appl. No. 14/968,594, Amendment and Response filed Apr. 5, 2016, 7 pages.
U.S. Appl. No. 14/968,594, Notice of Allowance dated Jul. 19, 2016, 6 pages.
U.S. Appl. No. 14/968,594, Office Action dated Feb. 3, 2016, 5 pages.
U.S. Appl. No. 14/975,510, Amendment and Response filed May 12, 2016, 8 pages.
U.S. Appl. No. 14/975,510, Notice of Allowance dated Jul. 7, 2016, 5 pages.
U.S. Appl. No. 14/975,510, Office Action dated Feb. 12, 2016, 6 pages.
U.S. Appl. No. 15/017,211, Notice of Allowance dated Jul. 5, 2016, 10 pages.
U.S. Appl. No. 15/017,211, Notice of Allowance dated Aug. 8, 2016, 4 pages.
U.S. Appl. No. 15/232,490, Office Action dated Sep. 23, 2016, 5 pages.
European Search Report in Application 13790911.5, dated Oct. 14, 2016, 10 pages.
Loy et al., "Fast Radial Symmetry for Detecing Points of Interest", IEEE Transactions on Pattern Analysis and Machine Intelligence, IEEE Computer Society, USA, vol. 25, No. 8, Aug. 1, 2003, 15 pages.
European Search Report in Application 14795148.7, dated Dec. 7, 2016, 7 pages.
Airioiu, "Force Feedback Stabilization for Remote Control of an Assistive Mobile Robot", AACC Publication, 2011, pp. 4898-4903.
Chinese Office Action in Application 201380036857.2, dated Jun. 29, 2016, 10 pages.
Chinese Office Action in Application 201620300686, dated Sep. 9, 2016, 3 pages.
Diolaiti et al., "Tele-operation of a Mobile Robot Through Haptic Feedback", IEEE, 2002, p. 1-6.
European Search Report in Application 13817382.2, dated Mar. 11, 2016, 8 pages.
Hashimoto et al., "TouchMe: An Augmented Reality Based Remote Robot Manipulation", Nov. 2011, pp. 61-66.
Korean Office Action in Application 10-2015-7003642, dated Nov. 28, 2016, 13 pages.
Osorio et al., "Mobile Robots Design and Implementation: From Virtual Simulation to Real Robots", IDME Publication, 2010, 6 pages.
PCT International Search Report in PCT/US2013/050327, dated Oct. 15, 2013, 11 pages.
PCT International Search Report in PCT/US2014/037013, dated Aug. 26, 2014, 8 pages.
PCT International Search Report in PCT/US2014/068606, dated Mar. 2, 2015, 7 pages.
PCT International Search Report in PCT/US2015/030877, dated Aug. 13, 2015, 5 pages.
PCT International Search Report in PCT/US2015/044885, dated Oct. 29, 2015, 7 pages.
Simsarian et al., "Achieving Virtual Presence with a Semi-autonomous Robot through a Multi-reality and speech control interface", 1996, pp. 50-63.
U.S. Appl. No. 13/342,853, Amendment and Response filed Feb. 19, 2013, 7 pages.
U.S. Appl. No. 13/342,853, Notice of Allowance dated Apr. 19, 2013, 6 pages.
U.S. Appl. No. 13/342,853, Notice of Allowance dated Jun. 20, 2013, 6 pages.
U.S. Appl. No. 13/342,853, Office Action dated Oct. 16, 2012, 10 pages.

(56) References Cited

OTHER PUBLICATIONS

U.S. Appl. No. 13/342,874, Amendment and Response filed Sep. 13, 2013, 21 pages.
U.S. Appl. No. 13/342,874, Amendment and Response filed Jan. 21, 2014, 13 pages.
U.S. Appl. No. 13/342,874, Amendment and Response filed Jul. 14, 2014, 13 pages.
U.S. Appl. No. 13/342,874, Amendment and Response filed Mar. 5, 2015, 11 pages.
U.S. Appl. No. 13/342,874, Amendment and Response filed Jul. 7, 2015, 9 pages.
U.S. Appl. No. 13/342,874, Notice of Allowance dated Jul. 24, 2015, 18 pages.
U.S. Appl. No. 13/342,874, Notice of Allowance dated Aug. 11, 2015, 3 pages.
U.S. Appl. No. 13/342,874, Office Action dated Apr. 29, 2013, 16 pages.
U.S. Appl. No. 13/342,874, Office Action dated May 13, 2013, 17 pages.
U.S. Appl. No. 13/342,874, Office Action dated Nov. 18, 2013, 17 pages.
U.S. Appl. No. 13/342,874, Office Action dated Sep. 4, 2014, 16 pages.
U.S. Appl. No. 13/342,874, Office Action dated Apr. 7, 2015, 8 pages.
U.S. Appl. No. 13/342,884, Amendment and Response filed Sep. 16, 2013, 32 pages.
U.S. Appl. No. 13/342,884, Amendment and Response filed Jan. 21, 2014, 11 pages.
U.S. Appl. No. 13/342,884, Notice of Allowance dated Feb. 19, 2014, 14 pages.
U.S. Appl. No. 13/342,884, Office Action dated Apr. 16, 2013, 13 pages.
U.S. Appl. No. 13/342,884, Office Action dated Nov. 18, 2013, 15 pages.
U.S. Appl. No. 13/342,892, Amendment and Response filed Sep. 9, 2013, 27 pages.
U.S. Appl. No. 13/342,892, Amendment and Response filed Feb. 18, 2014, 12 pages.
U.S. Appl. No. 13/342,892, Appeal Brief filed Jul. 17, 2014, 30 pages.
U.S. Appl. No. 13/342,892, Office Action dated Apr. 9, 2013, 19 pages.
U.S. Appl. No. 13/342,892, Office Action dated Nov. 15, 2013, 18 pages.
U.S. Appl. No. 13/342,892, Response to Appeal Brief dated Aug. 6, 2014, 16 pages.
U.S. Appl. No. 13/342,908, Advisory Action dated Aug. 11, 2014, 3 pages.
U.S. Appl. No. 13/342,908, Advisory Action dated Sep. 18, 2014, 4 pages.
U.S. Appl. No. 13/342,908, Amendment and Response filed Oct. 15, 2013, 32 pages.
U.S. Appl. No. 13/342,908, Amendment and Response filed Mar. 20, 2014, 21 pages.
U.S. Appl. No. 13/342,908, Amendment and Response filed Aug. 4, 2014, 13 pages.
U.S. Appl. No. 13/342,908, Amendment and Response filed Sep. 5, 2014, 18 pages.
U.S. Appl. No. 13/342,908, Amendment and Response filed Apr. 6, 2015, 12 pages.
U.S. Appl. No. 13/342,908, Notice of Allowance dated Apr. 29, 2015, 12 pages.
U.S. Appl. No. 13/342,908, Office Action dated Jun. 13, 2013, 34 pages.
Chinese Office Action in Application 201620300686.0, dated Feb. 3, 2016, 5 pages.
Chinese Office Action in Application 201702030180700, dated Feb. 7, 2017, 8 pages.
Japanese Office Action in Application 2015-512768, dated Dec. 6, 2016, 9 pages.
PCT International Preliminary Report on Patentability in PCT/US2015/030877, dated Feb. 23, 2017, 5 pages.
PCT International Preliminary Report on Patentability in PCT/US2015/044885, dated Feb. 23, 2017, 5 pages.
U.S. Appl. No. 14/054,636, Notice of Allowance dated Mar. 1, 2017, 7 pages.
U.S. Appl. No. 14/271,203, Office Action dated Feb. 21, 2017, 12 pages.
U.S. Appl. No. 15/232,490, Amendment and Response filed Feb. 22, 2017, 3 pages.
Airplane Flying Handbook (FAA-H-8083-3B) Chapter 10, Figure, 10-2, https://www.faa.gov/regulations_policies/handbooks_manuals/aviation/airplane_handbook/media/12_afh_ch10.pdf, 10 pages, 2004, 10 pages.
Xialing Lv and Minglu Zhang, Robot Control Based on Voice Command, IEEE International Conference on Automation and Logistics 2490, 2008, 5 pages.
Curriculum of Dr. Jason Janet cited in IPR2017-01272, filed Apr. 20, 2017, 6 pages.
Declaration of Dr. Jason Janet cited in IPR2017-01272, filed Apr. 20, 2017, 79 pages.
Randall Munroe, New Pet, http://xkcd.com/413/, Retrieved from Internet Archive (http://web.archive.org/web/20080701080435/http://xkcd.com/413/) (2008), Retrieved on Apr. 13, 2017, 3 pages.
Gene F. Franklin, J. David Powell, Abbas Emami-Naeini, Feedback Control of Dynamic Systems, Fourth Edition, Prentice Hall, 2002, 28 pages.
Hashem Ghariblu and Hadi Mohammadi, Structure and Dynamic Modeling of a Spherical Robot, 8th International Symposium on Mechatronics and its Applications, 2012, 5 pages.
Hiroyuki Fujita, A Decade of MEMS and its Future, Proceedings IEEE the Tenth Annual International Workshop on Micro Electro Mechanical Systems, 1997, 8 pages.
How a Small Robotics Startup Helped Disney Bring BB-8 to Life, US Chamber of Commerce (https://www.uschamber.com/above-thefold/how-small-robotics-startup-helped-disney-bring-bb-8-life), Retrieved on Mar. 31, 2017, 6 pages.
Qiang Zhan, Yao Cai, and Caixia Yan, Design, Analysis and Experiments of an Omni-Directional Spherical Robot, IEEE International Conference on Robotics and Automation 4921, 2011, 6 pages.
Martyn Williams, Sony unwraps high-tech 'healing' ball, CNN.com, published Mar. 28, 2002, http://edition.cnn.com/2002/TECH/ptech/03/28/robodex.healing.ball.idg/?related, retreived on Apr. 4, 2017, 1 page.
Masato Ishikawa, Ryohei Kitayoshi, and Toshiharu Sugie, Dynamic rolling locomotion by spherical mobile robots considering its generalized momentum, Proceedings of SICE Annual Conference 2010 2311 (2010), 6 pages.
Meet BB-8: The New Droid in the Lives of Star Wars Buffs, Wharton School of the University of Pennsylvania (Nov. 13, 2015) (http://knowledge.wharton.upenn.edu/article/meet-bb-8-the-newdroid-in-the-lives-of-star-wars-buffs/), Retrieved on Mar. 31, 2017, 3 pages.
Petition for Inter Parties Review of U.S. Pat. No. 9,211,920, filed Apr. 20, 2017, 75 pages.
U.S. Appl. No. 15/232,490, Office Action dated Mar. 17, 2017, 4 pages.
U.S. Appl. No. 15/040,331, Office Action dated Apr. 13, 2017, 10 pages.
U.S. Appl. No. 13/549,097, Amendment and Response filed Mar. 14, 2017, 13 pages.
U.S. Appl. No. 14/137,954, Notice of Allowance dated Mar. 8, 2017, 8 pages.
U.S. Appl. No. 14/884,632, Amendment and Response filed Apr. 19, 2017, 3 pages.
U.S. Appl. No. 15/281,478, Office Action dated May 5, 2017, 5 pages.
U.S. Appl. No. 15/232,490, Amendment and Response filed Jul. 10, 2017, 3 pages.

(56) References Cited

OTHER PUBLICATIONS

U.S. Appl. No. 15/146,631, Office Action dated May 16, 2017, 11 pages.
U.S. Appl. No. 15/040,331, Amendment and Response filed Jul. 10, 2017, 10 pages.
U.S. Appl. No. 14/884,632, Supplemental Notice of Allowance dated Jun. 1, 2017, 2 pages.
U.S. Appl. No. 14/884,632, Notice of Allowance dated May 15, 2017, 8 pages.
U.S. Appl. No. 13/342,892, Board Decision dated May 5, 2017, 8 pages.
U.S. Appl. No. 13/342,892, Notice of Allowance dated Jun. 7, 2017, 7 pages.
U.S. Appl. No. 13/342,892, Supplemental Notice of Allowance dated Jun. 29, 2017, 2 pages.
U.S. Appl. No. 13/549,097, Office Action dated Jun. 26, 2017, 30 pages.
U.S. Appl. No. 14/054,636, Notice of Allowance dated Jul. 7, 2017, 7 pages.
U.S. Appl. No. 14/137,954, Notice of Allowance dated Jun. 29, 2017, 8 pages.
European Extended Search Report in Application 14795148.7, dated Apr. 5, 2017, 12 pages.
Chinese Office Action in Application 201380036857.2, dated Mar. 22, 2017, 11 pages.
Japanese Office Action in Application 2015-521853, dated Feb. 14, 2017, 6 pages.
U.S. Appl. No. 15/232,490, Notice of Allowance dated Sep. 21, 2017, 7 pages.
U.S. Appl. No. 15/146,631, Office Action dated Sep. 21, 2017, 14 pages.
U.S. Appl. No. 13/549,097, Advisory Action dated Sep. 22, 2017, 2 pages.
U.S. Appl. No. 13/342,892, Supplemental Notice of Allowance dated Jul. 26, 2017, 2 pages.
U.S. Appl. No. 13/549,097, Amendment and Response filed Aug. 25, 2017, 11 pages.
U.S. Appl. No. 14/054,636, Supplemental Notice of Allowance dated Aug. 2, 2017, 4 pages.
U.S. Appl. No. 14/137,954, Supplemental Notice of Allowance dated Jul. 27, 2017, 2 pages.
U.S. Appl. No. 14/271,203, Amendment and Response filed Aug. 18, 2017, 11 pages.
U.S. Appl. No. 14/884,632, Supplemental Notice of Allowance dated Jul. 28, 2017, 2 pages.
U.S. Appl. No. 15/040,331, Notice of Allowance dated Aug. 1, 2017, 9 pages.
U.S. Appl. No. 15/146,631, Amendment and Response filed Aug. 18, 2017, 10 pages.
U.S. Appl. No. 15/177,809, Office Action dated Aug. 16, 2017, 6 pages.
U.S. Appl. No. 15/180,485, Office Action dated Aug. 17, 2017, 9 pages.
U.S. Appl. No. 15/232,490, Notice of Allowance dated Aug. 10, 2017, 5 pages.
U.S. Appl. No. 15/281,478, Amendment and Response filed Sep. 5, 2017, 8 pages.
Wright's Brothers Propulsion System, Smithsonian national Air and Museum, retrieved , retreived Aug. 17, 2017, https://airandspace.si.edu/exhibitions/wright-brothers/online/fly/1903/propulsion.cfm, 5 pages.
Chinese Notice of Allowance in Application 201380036857.2, dated Aug. 1, 2017, 4 pages.
Chinese Office Action in Application 201510463336.6, dated Jul. 17, 2017, 5 pages. (No English Translation).
Korean Notice of Allowance in Application 10-2015-7003642, dated Jul. 25, 2017, 4 pages.
Chinese Office Action in Application 201480029695.4, dated May 27, 2017, 22 pages.
Chinese Office Action in Application 201510463007.1, dated May 31, 2017, 8 pages.
Chinese Office Action in Application 201620300686, dated May 2, 2017, 2 pages. (No English Translation).
European Extended Search Report in Application 14853882.0, dated Jun. 22, 2017, 6 pages.
European Office Action in Application 13817383.8, dated Apr. 20, 2017, 6 pages.
Korean Office Action in Application 10-2014-7034020, dated Jun. 30, 2017, 11 pages.
U.S. Appl. No. 15/281,409, Office Action dated Jul. 6, 2018, 19 pages.
U.S. Appl. No. 15/180,485, Notice of Allowance dated Jun. 4, 2018, 2 pages.
U.S. Appl. No. 15/010,337, Amendment and Response filed May 22, 2018, 10 pages.
U.S. Appl. No. 15/146,631, Notice of Allowance dated Aug. 15, 2018, 5 pages.
European Extended Search Report in Application 15831882.4, dated Jun. 13, 2018, 13 pages.
European Office Action in Application 13817382.8, dated Aug. 3, 2018, 4 pages.
A. Milelle et al., "Model-Based Relative Localization for Cooperative Robots Using Stero Vision", Dec. 3, 2005, https://infoscience.epfl.ch/record/97591/files/Model-Based_Relative_Localization_MILELLA05.pdf.
European Office Action in Application 13790911.5, dated Jan. 26, 2018, 7 pages.
U.S. Appl. No. 14/146,631, Office Action dated Feb. 2, 2018, 12 pages.
U.S. Appl. No. 15/146,631, Advisory Action dated Apr. 23, 2018, 2 pages.
U.S. Appl. No. 14/271,203, Amendment and Response filed Dec. 22, 2017, 12 pages.
U.S. Appl. No. 15/010,337, Office Action dated Dec. 22, 2017, 12 pages.
U.S. Appl. No. 15/146,631, Amendment and Response filed Dec. 18, 2017, 9 pages.
U.S. Appl. No. 15/281,478, Amendment and Response filed Jan. 29, 2018, 8 pages.
U.S. Appl. No. 15/281,478, Office Action dated Dec. 15, 2017, 6 pages.
U.S. Appl. No. 15/177,809, Notice of Allowance dated Dec. 12, 2017, 8 pages.
U.S. Appl. No. 15/180,485, Amendment and Response filed Dec. 22, 2017, 8 pages.
U.S. Appl. No. 15/180,485, Notice of Allowance dated Jan. 26, 2018, 10 pages.
Chinese Notice of Allowance in Application 201510463336.6, dated Nov. 17, 2017, 4 pages.
European Office Action in Application 12731845.7, dated Oct. 25, 2017, 6 pages.
European Office Action in Application 13817382.8, dated Nov. 14, 2017, 5 pages.
Japanese Office Action in 2015-512768, dated Sep. 26, 2017, 10 pages.
Japanese Office Action in Application 2015-521853, dated Oct. 31, 2017, 6 pages.
U.S. Appl. No. 13/549,097, Amendment and Response filed Oct. 24, 2017, 11 pages.
U.S. Appl. No. 14/271,203, Office Action dated Oct. 18, 2017, 13 pages.
U.S. Appl. No. 15/177,809, Amendment and Response filed Nov. 17, 2017, 7 pages.
U.S. Appl. No. 15/180,485, Amendment and Response filed Nov. 17, 2017, 11 pages.
U.S. Appl. No. 15/180,485, Office Action dated Dec. 7, 2017, 9 pages.
U.S. Appl. No. 15/281,478, Notice of Allowance dated Feb. 22, 2018, 8 pages.
Chinese Notice of Allowance in Application 201510463007.1, dated Mar. 5, 2018, 6 pages.

(56) References Cited

OTHER PUBLICATIONS

Chinese Office Action in Application 201480029695.4, dated Feb. 23, 2018, 14 pages.
European Search Report in Application 15831882.4, dated Mar. 1, 2018, 16 pages.
U.S. Appl. No. 15/177,809, Supplemental Notice of Allowance dated Mar. 15, 2018, 2 pages.
U.S. Appl. No. 15/177,809, Supplemental Notice of Allowance dated Mar. 21, 2018, 2 pages.
U.S. Appl. No. 15/180,485 Supplemental Notice of Allowance dated Mar. 15, 2018, 2 pages.
U.S. Appl. No. 14/271,203, Office Action dated Apr. 6, 2018, 13 pages.
U.S. Appl. No. 13/549,097, Notice of Allowance dated Apr. 18, 2018, 12 pages.
U.S. Appl. No. 14/933,827, Office Action dated May 10, 2018, 7 pages.
European Office Action in Application 14795148.7, dated Oct. 4, 2018, 7 pages.
U.S. Appl. No. 14/271,203, Amendment and Response filed Sep. 5, 2018, 7 pages.
U.S. Appl. No. 15/010,337, Notice of Allowance dated Sep. 11, 2018, 17 pages.
U.S. Appl. No. 15/822,676, Office Action dated Nov. 30, 2018, 27 pages.
U.S. Appl. No. 15/888,354, Office Action dated Oct. 5, 2018, 13 pages.
U.S. Appl. No. 15/146,631, Notice of Allowance dated Oct. 11, 2018, 2 pages.
Chinese Notice of Allowance in 201480029695.4, dated Jan. 15, 2019, 4 pages.
Chinese Office Action in 201580055348.3, dated Dec. 5, 2018, 17 pages.
U.S. Appl. No. 15/281,409, Amendment and Response filed Jan. 7, 2019, 16 pages.
U.S. Appl. No. 15/888,354, Amendment and Response filed Jan. 4, 2019, 6 pages.
U.S. Appl. No. 14/271,203, Notice of Allowance dated Dec. 18, 2018, 7 pages.

* cited by examiner

REMOTELY CONTROLLING A SELF-PROPELLED DEVICE IN A VIRTUALIZED ENVIRONMENT

RELATED APPLICATIONS

This application is a continuation of patent application Ser. No. 13/766,455, entitled "REMOTELY CONTROLLING A SELF-PROPELLED DEVICE IN A VIRTUALIZED ENVIRONMENT", filed Feb. 13, 2013, which is a continuation-in-part of U.S. patent application Ser. No. 13/342,853, entitled "SELF-PROPELLED DEVICE WITH ACTIVELY ENGAGED DRIVE SYSTEM", filed Jan. 3, 2012, now U.S. Pat. No. 8,571,781, issued Oct. 29, 2013, which claims the benefit of U.S. Provisional Application No. 61/430,023, entitled "METHOD AND SYSTEM FOR CONTROLLING A ROBOTIC DEVICE, filed Jan. 5, 2011; U.S. Provisional Application No. 61/430,083, entitled "SYSTEM AND METHOD FOR ESTABLISHING 2-WAY COMMUNICATION FOR CONTROLLING A ROBOTIC DEVICE", filed Jan. 5, 2011 and U.S. Provisional Application No. 61/553,923, entitled "A SELF-PROPELLED DEVICE AND SYSTEM FOR CONTROLLING SAME", filed Oct. 31, 2011; all of the aforementioned applications being hereby incorporated by reference in their respective entirety for all purposes.

TECHNICAL FIELD

Examples described herein relate to remote control of devices, and more specifically, to implementing remotely controlling devices in a virtualized environment.

BACKGROUND

Various kinds of remotely controllable devices exist. For example hobbyists often operate "RC" devices in the form of cars, trucks, airplanes and helicopters. Such devices typically receive commands from a controller device, and after movement (e.g., direction or velocity) based on the input. Some devices use software-based controllers, which can be implemented in the form of an application running on a device such as a smart phone or a tablet.

DETAILED DESCRIPTION

According to some embodiments, a computing device is operated to process image data in order to track a movement or position of a self-propelled device.

Still further, in some embodiments, a self-propelled device is tracked, and position information determined from tracking the self-propelled device is integrated with a virtual environment. The virtual environment can include facets that are based on the position and/or state of the object, as well as on other aspects of the real-world environment as determined from tracking and/or communicating with the self-propelled device.

In an embodiment, image data is generated by a camera component. The camera component can be provided as part of, or alternatively coupled to, a computing device that acts as a controller for a self-propelled device. From the image data, a location of the self-propelled device can be determined (e.g., relative to the computing device). Content can be generated based at least in part on the location of the self-propelled device as the self-propelled device is moved or otherwise operated through the controller.

In some variations, sensor input is received from the self-propelled device. In particular, the sensor input can be indicative of the position of the self-propelled device. By way of example, the self-propelled device can include a gyroscope, an inertial mass unit (IMU), a GPS, an accelerometer, a light sensor, and/or proximity sensor. The sensor information communicated from the self-propelled device can include readings or output from the sensors. Additionally, the sensor information communicated from the self-propelled device can be in raw form, or in processed form (e.g., numerical values determined from a combination of sensors).

According to another embodiment, a computing device operating as a controller can obtain image data from a camera component. The computing device can determine a location of the self-propelled device relative to the camera based on the image data. A virtual content may be generated on the computing device based at least in part on the location of the self-propelled device.

As used herein, the term "substantially" means at least almost entirely. In quantitative terms, "substantially" means at least 80% of a stated reference (e.g., quantity of shape).

In similar regard, "spherical" or "sphere" means "substantially spherical." An object is spherical if it appears rounded, contoured or elliptical to a user. Objects which include, for example, half-domes, quarter-domes, elliptical (dimension of one axis larger than another) can be considered spherical as used herein.

DETAILED DESCRIPTION

Figure 1:
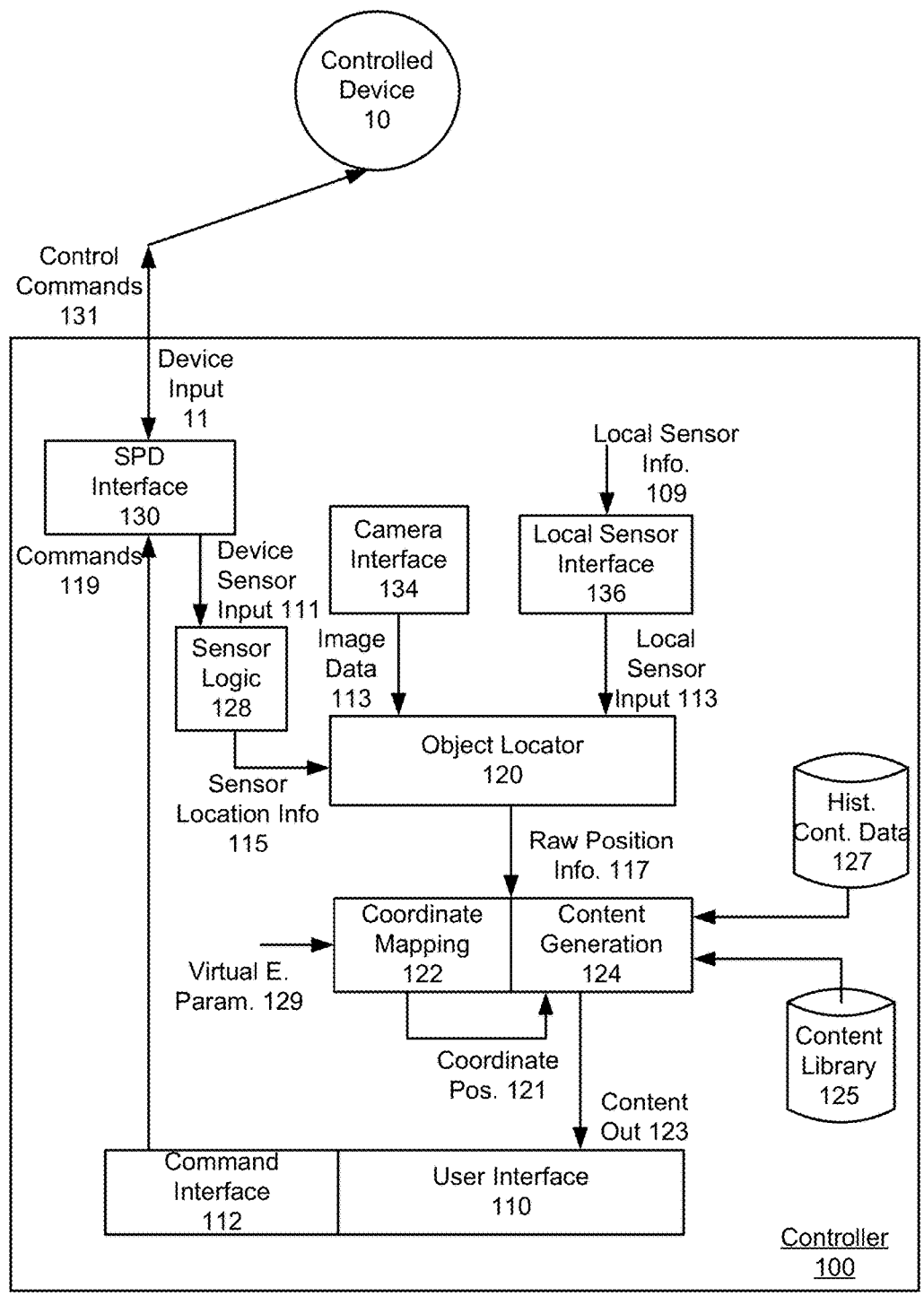
FIG. 1 illustrates a system for implementing a remotely controlling a self-propelled device in context of a virtual environment, according to an embodiment.

FIG. 1 illustrates a system for remotely controlling a self-propelled device in context of a virtual environment, according to an embodiment. In FIG. 1, system 50 includes a controller and a self-propelled device ("SPD") 10. The controller 100 can correspond to, for example, a mobile computing device, such as a voice/telephony device for cellular communications, or a roaming device that can use local wireless or similar communications to communicate with network nodes and/or other devices. By way of example, controller 100 can correspond to a smart phone, tablet, netbook are other mobile computing device that utilizes application layer logic (e.g., downloaded application or "app") or other programming to control the SPD 10. In variations, the controller 100 can be implemented as a dedicated or specialized device that controls self-propelled devices.

As described by various embodiments, SPD 10 can be operated to move under control of another device, such controller 100. In some embodiments, SPD 10 is configured with resources that enable one or more of the following: (i) maintain self-awareness of orientation and/or position relative to an initial reference frame after the device initiates movement; (ii) process control input programmatically, so as to enable a diverse range of program-specific responses to different control inputs; (iii) enable another device to control its movement using software or programming logic that is communicative with programming logic on the self-propelled device; and/or (iv) generate an output response for its movement and state that it is software interpretable by the control device.

With further reference to FIG. 1, controller 100 includes a user interface 110 an object detector 120, and an SPD interface 130. As described in greater detail, the user interface 110 can be operated to generate content that is based partially on the SPD 10, and/or the location of the SPD 10 relative to the controller 100. In particular, the user interface 110 can be used to generate content that provides a virtual (or augmented reality) context for the SPD 10. The user interface 110 can also include a command interface 112 that translates user input and/or other events into commands 119 for controlling the SPD 10 via the SPD interface 130.

In operation, controller 100 may include a camera interface 134, which obtains image data 113 depicting a real-time state of the SPD 10 in a scene that is captured by the camera of the controller 100. In one embodiment, the camera interface 134 receives image data that represents a series of images (or a video) of the scene in which the SPD 10 is present (e.g., moving under control of the controller 100). The object detector 120 can include image processing logic to analyze the image data 113, and to identify objects of interest from the image data 113. In particular, the object detector 120 can process the image data 113 in order to identify a depiction of the SPD 10, and optionally, a depiction of objects or landmarks in the scene that are deemed to be of interest.

In some implementations, the object detector 120 includes image analysis logic for analyzing image data 113 for presence of spheres, half spheres or portions thereof (e.g., quadrant of sphere). Thus, object detector 120 can include image processing logic for locating a shape that is indicative of SPD 10 (e.g., detect circle or portion thereof that is indicative of a spherical aspect of the SPD 10). Other characteristics such as illumination (e.g., LED illumination) or structural features of the SPD 10 can also be used to both detect the SPD 10, or to detect an orientation or other aspect of the SPD 10 in its environment. The object detector 120 can also include image processing resources that are configured to detect other specific kinds of objects other than spheres, such as objects typically encountered in the real world environment of SPD 10. These can include, for example, wall structures, table legs, or surfaces (e.g., carpet, grass etc.).

In one implementation, object detector 120 uses dimensional analysis to determine, from the image data 113, a relative position or distance of the SPD 10 from controller 100. In particular, one embodiment provides for the SPD 10 to be spherical. The object detector 120 can use dimensional analysis by comparing a dimension of the depiction for the SPD 10 (e.g., circle or portion thereof) with a reference dimension for the spherical housing of the self-propelled device.

In one variation, the controller 100 can also use local sensor information 109, provided from sensor devices resident on the computing device of controller 100. For example, local sensor information 109 can be provided by an accelerometer, gyroscope, magnetometer, or Global Positioning System (GPS) device that is resident on the computing device of the controller 100. As an addition or alternative, some implementations provide for the controller 100 to use the relative height of the controller 100 (e.g., distance from ground), and/or the orientation of the controller 100 with respect to a horizontal plane, in order to determine position information for the SPD 10.

As an addition or alternative, SPD 10 can communicate sensor input 11 to the controller 100. The sensor input 11 can correspond to, for example, information determined from an inertial mass unit ("IMU"), gyroscope, accelerometer, magnetometer, or GPS. The sensor input 11 can be either raw data, or data processed on the SPD 10 before being communicated to the controller 100. In variations, the controller 100 includes sensor logic 128, either with the object detector 120, or as a separate logical component (e.g., plug-in), to handle device sensor input 111 (corresponding to sensor input 11 provided from the SPD 10). The sensor logic 128 can determine sensor location information 115, corresponding to information that is indicative, probative or otherwise relevant to a position, relative location, or physical state of the SPD 10. Sensor location information 115 can be used by the object detector 120, in combination with image data 113, to determine a relative position for the SPD 10. The information determined for the SPD 10 can include, for example, a distance of the SPD 10 from the controller or reference point in either 1-, 2- or 3-dimensions, or a coordinate of the SPD 10 within a particular reference frame. The information determined from the SPD 10 can also be indicative of a physical state of the device (e.g., LED on device is on, device is going downhill or has hit obstruction, etc.).

In other variations, the position information for the SPD 10 can be communicated by the SPD to the controller 100 via a wireless link (e.g., Bluetooth). For example, the SPD 10 may be self-aware by way of its own geo-aware resources. In particular, the SPD 10 can include sensors and devices such as an accelerometer, a Global Positioning System (GPS) unit, a gyroscope and/or a magnetometer.

The object detector 120 can communicate raw position information 117 to one or more content output components of the controller 100. In one implementation, a coordinate mapping component 122 maps the raw position information 117 to coordinate positions 121 of an alternative reference frame that is specific to a particular virtual environment. The alternative reference frame can be generated and maintained through, for example, the content generation component 124, as part of a virtual environment. The content generation component 124 may independently use content input from, for example, a content library 125 in order to generate aspects of a virtual environment.

In some variations, the content generation component 124 can obtain virtual environment parameters 129 for use in creating specific virtual environments. For example, specific games or gaming scenarios may carry alternative virtual parameters 129. The virtual environment parameters 129 can, for example, (i) map raw position information 117 to virtual coordinates, (ii) convert detected objects into graphical representations (e.g., transfer real-world object into an anime gaming feature), and (iii) provide rules for a physics engine (e.g., application of Newtonian using virtual reference frame). Using the virtual environment parameters 129 and the content library 125, content generation component 124 can update the virtual environment using the raw position information 117 determined from tracking the position of the SPD 10. For example, a graphic representation of the SPD 10 can be reflected in the virtual environment, based on the position information and the alternative coordinate system provided by the coordinate mapping component 122.

As an addition or alternative, the content generation component 124 can include logic to (i) flag certain coordinates (e.g., determined from, or corresponding to raw position information 117) as landmarks or points of interest for future use in a virtual environment, and/or (ii) access a data store of historical content ("historical content store 127") that is based on prior landmarks or points of interest.

The content generation component 124 can provide content output 123 for user interface 110. The user interface 110 can create a presentation that depicts the content output 123. The user interface 110 can also include or modify the content output 123 to allot for input from the user that can affect operation of the SPD 10, as well as to permit manipulation of the content presented. For example, the user interface 110 can include a framework of graphic features that the user can interact with in order to (i) alter a virtual aspect provided from content generation component 124, and/or (ii) adjust performance or operation (e.g., speed up, change direction, stop, execute sequence, spin etc.) of the SPD 10.

In more detail, the user interface 110 can include the command interface 112 to enable the user to control the SPD 10. For example, the command interface 112 can correspond to one or more features or aspects of the virtual environment that allow the user to enter input for purpose of controlling movement, operations and other aspects of the SPD 10. As described elsewhere, subsequent control of SPD 10 (e.g., movement) can also affect the virtual environment.

Methodology

Figure 2:
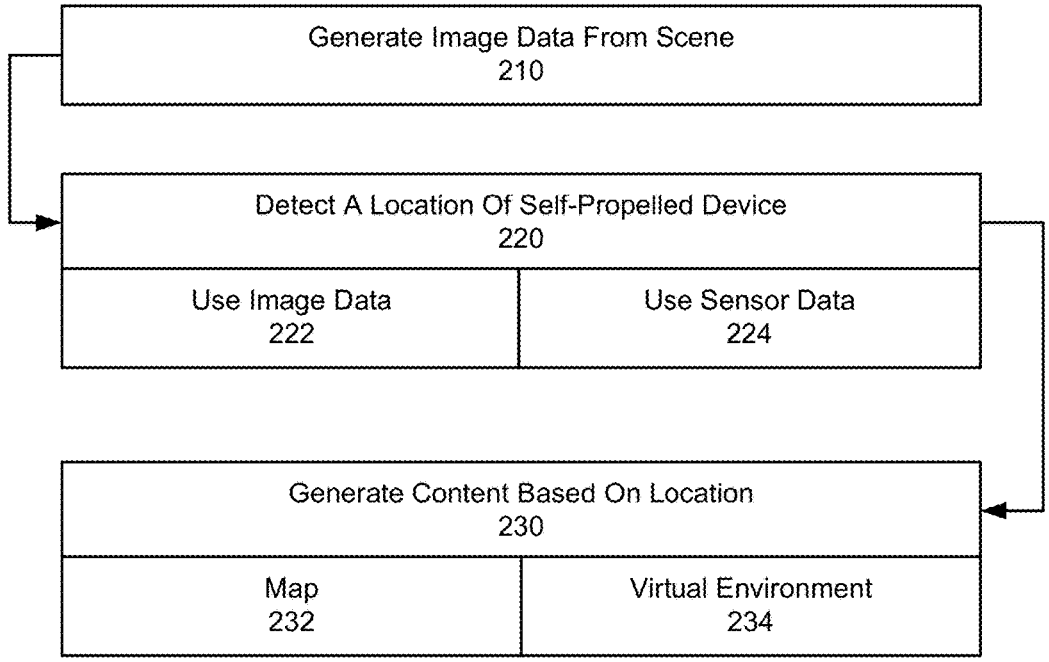
FIG. 2 illustrates a method for controlling a self-propelled device for use in a virtual environment, according to an embodiment.
Figure 3:
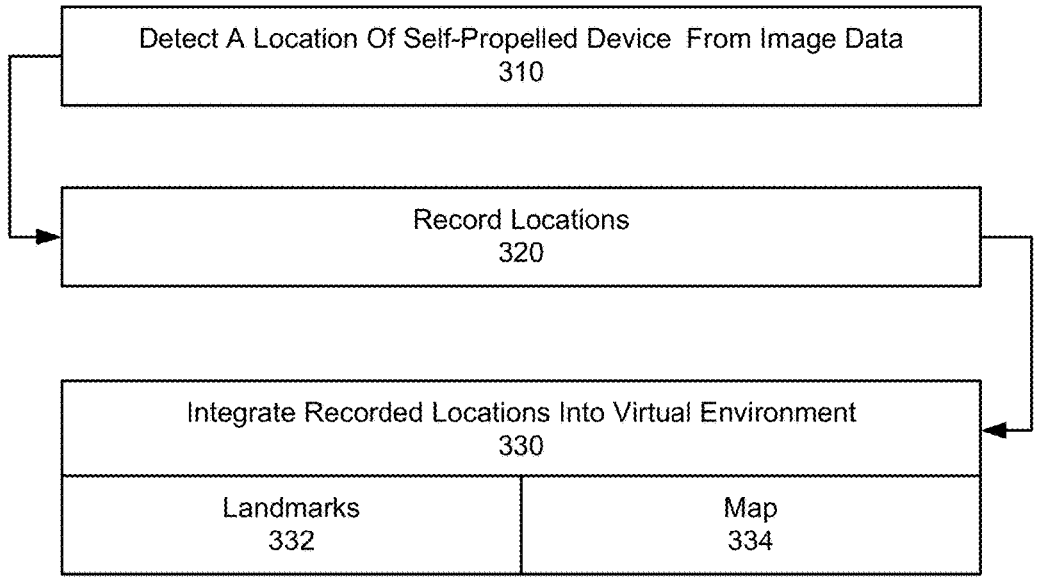
FIG. 3 illustrates a method for implementing a virtual environment for use with a remotely controlled self-propelled device, according to an embodiment.

FIG. 2 illustrates a method for controlling a self propelled device for use in a virtual environment, according to an embodiment. FIG. 3 illustrates a method for implementing a virtual environment for use with a self controlled device, according to an embodiment. Examples such as described with FIG. 2 and FIG. 3 can be implemented using components of the system such as described with FIG. 1. Accordingly, reference may be made to elements of FIG. 2 and FIG. 3 for purpose of illustrating suitable components or elements for performing a step or sub-step being described.

With reference to FIG. 2, image data can be generated for a particular scene in real time, with respect to the operation or movement of a self-propelled device (210). For example, controller 100 can be operated on a computing device that includes a camera. A user can point the camera to capture at the SPD 10 (e.g., operate the camera in video mode) in order to receive image data 113.

A location of a self-propelled device is detected from the scene (220). According to some embodiments, the image data is used to detect a location of the self-propelled device within a given scene. For example, in order to locate the SPD 10, the image processing logic can include object-type specific detectors to locate (i) shapes, such as circles, semi-circles, or portions thereof, in implementations in which the SPD 10 is a sphere, (ii) surface color (e.g., white), (iii) surface ornamentation or mark (e.g., visual code), or (iv) specific characteristic structural features. The image processing logic can also include object-type specific detectors to identify, from the image data objects that are likely to be found in the environment of the SPD 10. For example, object detector 120 can implement image processes to detect walls, rugs, specific kinds of floorings, pet dishes, steps, or lighting conditions that may be present in the environment of the SPD 10.

As an addition or alternative, controller 100 can use sensor data 109, communicated from the SPD 10, in order to determine the position of the SPD in a given scene. For example, SPD 10 can include resources for being aware of its position relative to, for example, controller 100. U.S. patent application Ser. No. 13/342,853, which is incorporated by reference herein, describes various sensor inputs and logic for enabling a device such as SPD 10 be self-aware of its location.

Content is generated based on the location of the SPD 10 (230). In particular, various kinds of virtual content can be generated that are based on movement, physical presence of other aspects of SPD 10 in the real-world environment. In one implementation, the content provided includes a map or other depiction of physical space (232). For example, the SPD 10 can be operated in a room, and a graphic map of the room, or of an alternative environment (e.g. gaming environment, such as a race track) can be generated that is based on the position of the SPD 10.

As an addition or alternative, the generated content can correspond to a virtual environment (234), such as, for example, in environment in which the SPD 10 has a virtual representation, and the surrounding environment is based partly on the real-world environment of the SPD 10. A set of virtual parameters can be determined as part of generating content. For example, a virtual map can be structured, and/or used as a framework or basis for conducting other events and aspects of a virtual environment. The virtual map can be determined from, for example, a path of the SPD, identified landmarks and other events, then translated into an alternative reference frame for the specific virtual environment.

With respect to FIG. 3, the location of a self-propelled device is determined from image data (310). In one implementation, the self-propelled device can have a geometry or shape that is detectable from the surrounding environment when viewed through image data. Dimensional analysis can be performed on the detected shape within the image data in order to determine a relative position (e.g., distance) of the self-propelled device with respect to a particular reference, such as the location where the image is captured (e.g., controller 100). As an example, the self-propelled device can be implemented as a sphere, and image processing logic of the controller can be configured to detect circles are ellipses (or portions thereof) that can correspond to the sphere. Based on the dimensions of the circle or ellipse, the relative position of the self-propelled device can be determined. The relative position can be determined as a coordinate (e.g., in 2- or 3-D), or through single linear dimension such as distance from the point where the image is captured.

In an embodiment, the location of the self-propelled device is recorded as the object moves about its scene (320). Thus, the self-propelled device can be tracked as it moves about. A path can be determined for the self-propelled device based on its past locations in a given timeframe.

The locations of the self-propelled device can be recorded over a given duration (330). For example, the device can be operated in a given time frame, and the movement of the device can be sampled by way of image processing. The self-propelled device can also be tracked so that the device's path can be determined for the given time period. The path or recorded locations of the self-propelled device can then be integrated into a virtual environment. More generally, the position of the self-propelled device can be integrated with content that is otherwise independent of the real-world environment of the self-propelled device.

In particular, some embodiments provide for recording landmarks that the self-propelled device experiences (332). Landmarks can include, for example, a starting point, an obstruction such as a wall or table leg, variations of the underlying surface in which to self-propelled device operates (e.g., type of flooring), variations in lighting (e.g., well lighted place versus dark place), and variations in the gradient of the underlying surface.

As another addition our variation, the recorded path of the self-propelled device can be used to generate a map (334). The map can define geographic parameters that are translated into a virtual environment. For example, the walls of the room can be translated into a track. The path of the object can also be translated into a virtual path. The map can also include the landmarks, as determined in (332).

EXAMPLE

Figure 4:
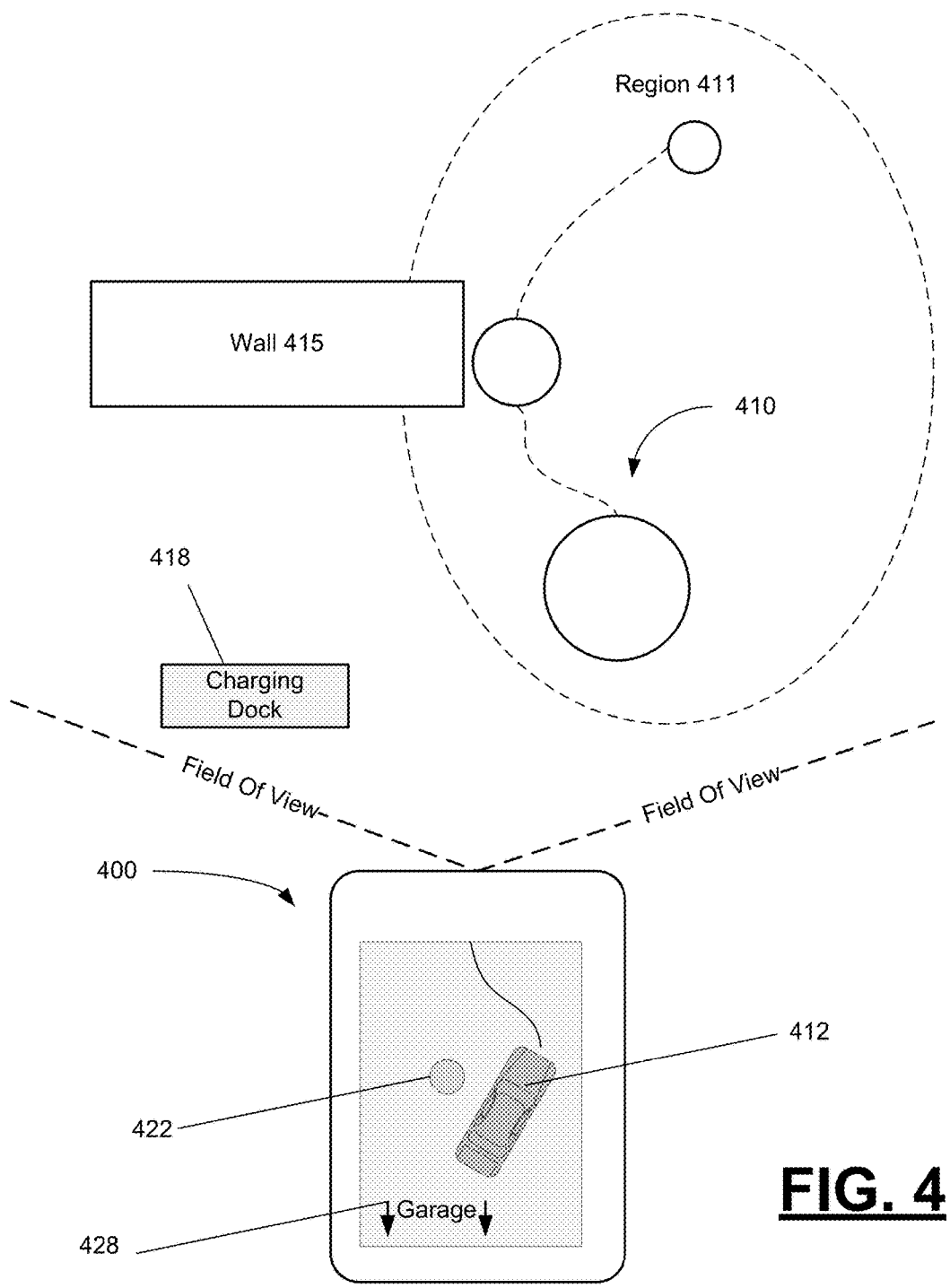
FIG. 4 illustrates an example of a virtual environment on a device that controls movement of another device.

FIG. 4 illustrates an example of a virtual environment on a device that controls movement of another device. In an example of FIG. 4, a mobile device 400 operates as a controller for a self-propelled device 410. In particular, the mobile device 400 can execute software (e.g., downloaded application) which creates virtual environment that is based on the movements of the self-propelled device 410. For example, mobile device 400 can execute different applications, of which each generate separate virtual environments, and each virtual environment can have a corresponding content, theme, simulated physics, and user involvement (e.g., how and what the user can respond to, input features etc.).

A field of view for a camera component 404 of the device 400 can monitor the region 411 for movement or changes to the physical state of the self-propelled device 410. The region 411 can also extend beyond the field of view. For example, the region 411 can encompass multiple rooms or an extended path traversed by the self-propelled device.

In the example of FIG. 4, the mobile device 400 renders a virtual environment in which the self-propelled device is reflected as a vehicle moving about obstacles. Thus, the self-propelled devices depicted in alternative, graphic form. The mobile device 400 may execute an application that coordinates a virtual environment with the real-world events related to the movement of the self-propelled device 410 in a given area. In an example of FIG. 4, the self-propelled device 410 is depicted as an automobile 412 on the mobile device 400. An application, running on the mobile device 400, renders the self-propelled device 410 as a vehicle. A remainder of the virtual environment can reflect hazards or other facets that tie into what the self-propelled device 410 experiences.

According to some embodiments, the self-propelled device can be moved in the real world amongst obstacles, and landmarks or points of interest. A region 411 in which the self-propelled device 410 is moved in the real-world can also be mapped into the virtual environment, and some landmarks or points of interest within the region 411 can be reflected in alternative forms in the virtual environment. For example, real-world obstruction such as walls 415 can be reflected as an obstacle 422 (e.g., one that is smaller in size) in the virtual environment. As another example, a charging dock 418 can be used as a landmark for the self-propelled device in maintaining a point of reference for future use. For example, the location of the charging dock 418 can be recorded and mapped to a virtual garage 428.

In some embodiments, mobile device 400 uses a camera to track the object in a given real-world region. The position of the object in the given region can be reflected in the corresponding virtual environment. Each virtual environment in use on the mobile device 400 can map to the real world based on a set of transformations. Thus, for example, mobile device 400 can use its camera to track the self-propelled device 410, and the position of the self-propelled device (as well as other physical information) can be used to coordinate the position of a virtual object of interest in a corresponding virtual environment.

Additionally, the self-propelled device 410 can be shaped so that it is readily detectable from image data. Still further, the self-propelled device 410 can be shaped so that the relative depth or distance from the mobile device 400 can be determined based on dimensional analysis of the detected shape versus a reference. For example, as shown by an example of FIG. 4, the self-propelled device 410 can be spherical, so that the detected size of the object in the image data can be correlated to a physical distance measure.

Optionally, the mobile device 400 can use sensor input from the self-propelled device, as an alternative or addition to using image data. The self-propelled device can communicate, for example, information determined from the IMU of the device. This information can enable the device to determine its own location relative to a particular reference frame. The device 400 can signal the information to the mobile device 400 using a wireless link.

Controller Hardware Diagram

Figure 5:
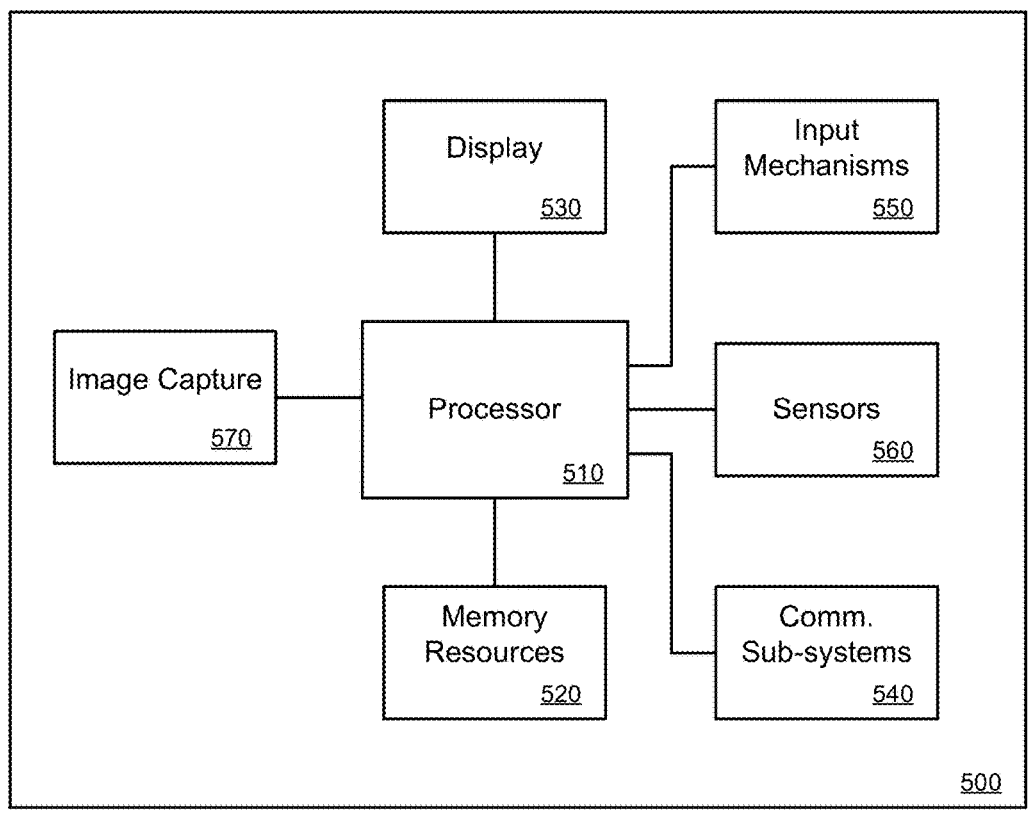
FIG. 5 illustrates an example hardware diagram a computing device on which a controller for a self-propelled device can be implemented.

FIG. 5 illustrates an example hardware diagram a computing device on which a controller for a self-propelled device can be implemented. In particular, a computing device 500 can configured to implement functionality described with, for example, controller 100 as described by some embodiments of FIG. 1. In some implementations, the computing device 500 is a mobile device, such as a cellular telephony messaging device that (e.g., IPHONE model device manufactured by APPLE INC.) or tablet (e.g., IPAD model device manufactured by APPLE INC.) which executes one or more applications for controlling movement and other operations of a self-propelled device. For example, in the context of FIG. 1, system 50 may be implemented by memory and processor resources as described in FIG. 5.

In one embodiment, the computing device 500 includes one or more processors 510, memory resources 520, a display device 530, one or more communication sub-systems 540 (including wireless communication sub-systems), and one or more sensors 560. According to different implementations, the communication sub-systems 540 enables the computing device 500 to exchange wireless communications with a self-propelled device using wireless communication mediums and protocols (e.g., WI-FI, BLUETOOTH, Infrared). In some embodiments, the computing device 500 can also include one or more input mechanisms 550 (e.g., a button, a switch, a touch-sensitive input device).

The processor 510 can be configured with software and/or other logic to perform one or more processes, steps and functions described with the various examples described herein, such as described by FIG. 1 through FIG. 3. Accordingly, the processor 510 can be configured, with instructions and data stored in the memory resources 520, to implement functionality described with controller 100 (as described with FIG. 1). The memory resources 520 may store instructions (e.g., applications) used by the processor 510 in implementing the functionality of the controller 100. For example, the memory resources 520 may store instructions for enabling the processor to (i) determine position information for the self-propelled device, (ii) implement a virtual reality where a graphic representing the self-propelled device is presented, and (iii) communicate and command the self-propelled device.

In performing operations of the controller, the processor 510 may utilize various forms of input. In particular, processor 510 can receive user input via the input mechanisms (e.g., touch sensor integrated with display, buttons, voice input etc.). Furthermore, the processor 510 can also receive sensor input from one or more sensors 560 that are included with the computing device 500. Examples of sensors 560 include accelerometers, proximity sensors, capacitive sensors, light sensors, magnetometers, inertial mass unit (or IMU) or gyroscopes. As described with an example of FIG. 1, processor 510 may also receive image data from image capture device 570, such as a charged-coupled device (CCD) camera that is able to capture video and images.

In one embodiment, the processor 510 can control the display device 530 to provide virtual or "augmented reality" content. As described with other examples, such content may include alternative graphic representations of a self-propelled device, as well as virtual elements or facets which are affected by real-world events, particularly relating to the position, movement and state of the self-propelled device that is under control of the computing device 500.

Self-Propelled Device

Figure 6A:
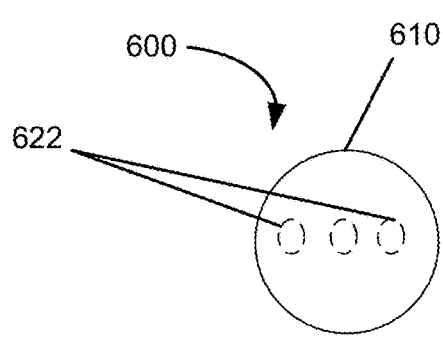
FIG. 6A and FIG. 6B illustrate examples of self-propelled devices, under some embodiments.
Figure 6B:
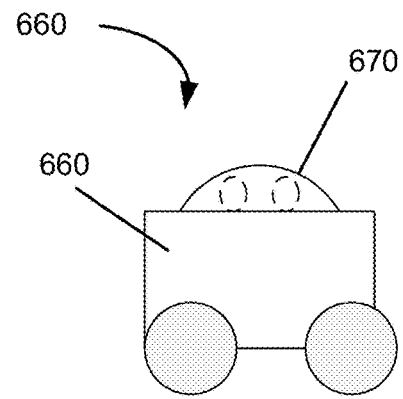

FIG. 6A and FIG. 6B illustrate examples of self-propelled devices, under some embodiments. With reference to FIG. 6A, a self-propelled device 600 can be spherical in shape, and include internal components 622 such as a drive system, sensors (e.g., gyroscope, inertial mass unit (IMU), GPS, accelerometer, light sensor, proximity sensor, etc.), processing resources and communication interface for communicating with a controller using a wireless communication medium (e.g., Bluetooth, Wi-Fi etc.). Numerous examples for the construction and operation of the self-propelled device, in accordance with an example such as provided in FIG. 6A and elsewhere in this application, are disclosed in, for example, U.S. patent application Ser. No. 13/342,863 and U.S. patent application Ser. No. 13/261,647; both of which are hereby incorporated in its entirety by reference.

In some examples, the self-propelled device 600 includes a housing 610 that is substantially spherical. In variations, the housing can be elliptical, semi-spherical, or include spherical portions. Other suitable geometric shapes may also be used. However, one advantage provided by using a spherical shape for the housing 610 is that the shape of the device remain symmetrical when viewed from various angles. This facilitates using image analysis for purpose of locating the object by relative position or distance.

With reference to FIG. 6B, a combination device 650 includes a second device 660 and a spherical housing element 670. The spherical housing element 670 may be modularized so as to be assembled onto the second device 660 as a self-contained unit, either during manufacturing or after-sale. For example, the second device 660 can correspond to a radio-frequency controlled device (e.g., car) that is augmented with the spherical housing element 670 to facilitate detection/position determination with use of image processing. In particular, the exposed spherical aspect of the housing element 670 can be imaged and subjected to dimensional or geometric analysis in order to approximate position information (e.g., distance from camera). As with other examples, the combined device can also include a variety of sensors 672, such as gyroscope, inertial mass unit (IMU), GPS, accelerometer, light sensor, or proximity sensor. For example, the housing element 670 can use wireless communications to signal additional sensor data to a controller device. The sensor data communicated from the sensors can also be indicative or determinative of the position of the housing element 670.

It is contemplated for embodiments described herein to extend to individual elements and concepts described, independently of other concepts, ideas or system, as well as to combinations of elements recited anywhere in this application. Although numerous examples are described in detail with reference to the accompanying drawings, it is to be understood that the embodiments extend beyond the described examples. Furthermore, it is contemplated that a particular feature described either individually or as part of an embodiment can be combined with other individually described features, or parts of other embodiments, even if the other features and embodiments make no mention of the particular feature.

What is claimed is:

1. A computer-implemented method for operating a computing device, the method comprising:
   generating image data by a camera component of the computing device;
   programmatically detecting, by the computing device, from the image data, a location of a self-propelled device relative to the computing device;
   receiving, at the computing device, input from the self-propelled device, the input including sensor information that is obtained on the self-propelled device; and
   generating, on the computing device, content based on the location of the self-propelled device as the self-propelled device moves, wherein the self-propelled device is remote from the computing device.

2. The computer-implemented method of claim 1, wherein programmatically detecting the location of the self-propelled device comprises image processing the image data.

3. The computer-implemented method of claim 2, wherein image processing the image data comprises utilizing an object-type specific detector to locate at least one of a predetermined shape, a predetermined color, a predetermined visual code, and a predetermined structural feature.

4. The computer-implemented method of claim 1, further comprising programmatically detecting, from the image data generated by the camera component of the computing device, a location of an object relative to at least one of the computing device and the self-propelled device.

5. The computer-implemented method of claim 1, wherein the sensor information comprises information obtained from at least one of a gyroscope, an inertial mass unit, a GPS, an accelerometer, a light sensor, and a proximity sensor located on the self-propelled device.

6. The computer-implemented method of claim 1, further comprising displaying the generated content on the computing device.

7. The computer-implemented method of claim 6, wherein the generated content comprises a map.

8. The computer-implemented method of claim 6, wherein the generated content comprises a depiction of a physical space in which the self-propelled device is located.

9. The computer-implemented method of claim 6, wherein the generated content corresponds to a virtual environment.

10. The computer-implemented method of claim 9, wherein the generated content comprises a graphic form of the self-propelled device.

11. The computer-implemented method of claim 1, further comprising:
    identifying a landmark from the image data generated by the camera component of the computing device; and
    translating the landmark into an object, wherein the generated content comprises a virtual environment and the object.

12. The computer-implemented method of claim 11, further comprising displaying the generated content on the computing device.

\* \* \* \* \*